(12) United States Patent
Kunioka et al.

(10) Patent No.: US 8,223,372 B2
(45) Date of Patent: Jul. 17, 2012

(54) PRINTING SYSTEM, IMAGE FORMING APPARATUS, WEB PAGE PRINTING METHOD, AND COMPUTER-READABLE STORAGE MEDIUM FOR COMPUTER PROGRAM

(75) Inventors: Jun Kunioka, Kawanishi (JP); Ayumi Itoh, Ikoma-gun (JP); Hiroyuki Kawabata, Kawanishi (JP); Hidetaka Iwai, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 797 days.

(21) Appl. No.: 12/402,688

(22) Filed: Mar. 12, 2009

(65) Prior Publication Data

US 2009/0310168 A1    Dec. 17, 2009

(30) Foreign Application Priority Data

Jun. 16, 2008    (JP) .................................. 2008-157262

(51) Int. Cl.
*G06F 3/12*    (2006.01)
*G06F 15/00*    (2006.01)
*G06F 7/00*    (2006.01)
*G06F 17/30*    (2006.01)

(52) U.S. Cl. ........ 358/1.15; 358/1.8; 358/1.13; 707/706

(58) Field of Classification Search ........................ None
See application file for complete search history.

(56) References Cited

U.S. PATENT DOCUMENTS

| | | | |
|---|---|---|---|
| 2003/0076528 A1* | 4/2003 | Parry et al. | 358/1.15 |
| 2007/0086051 A1* | 4/2007 | Kunori | 358/1.15 |
| 2007/0240228 A1* | 10/2007 | Kimura | 726/27 |
| 2008/0037043 A1* | 2/2008 | Hull et al. | 358/1.8 |
| 2008/0208845 A1* | 8/2008 | Yanagi | 707/5 |
| 2008/0219597 A1* | 9/2008 | Nakamura | 382/306 |
| 2011/0071998 A1* | 3/2011 | Yanagi | 707/706 |

FOREIGN PATENT DOCUMENTS

JP    2006-285461 A    10/2006

* cited by examiner

*Primary Examiner* — Satwant Singh
(74) *Attorney, Agent, or Firm* — Buchanan Ingersoll & Rooney PC

(57) ABSTRACT

An image forming apparatus is provided with: a job data reception processing portion that receives a command to print a web page and a conditional expression used to search for that web page from a terminal; a print execution processing portion that causes a printing device to print a web page based on the received command; a web browser portion that causes a search engine to search for a web page based on the received conditional expression and receives the results of that search; and a window display processing portion that causes the obtained results to be displayed in a display. The web browser portion furthermore obtains a web page selected by a user from the displayed results, and the print execution processing portion causes the printing device to print the obtained web page.

8 Claims, 20 Drawing Sheets

FIG. 8

TLK

| SEARCH CONDITION NUMBER | USER NUMBER | SEARCH CONDITION | | REGISTRATION DATE AND TIME |
|---|---|---|---|---|
| | | SEARCH ENGINE NAME | CONDITIONAL EXPRESSION | |
| 0001 | 021 | SearchA | MPF AND SPECIFICATIONS | 2007/12/25 17:05 |
| 0002 | 003 | SearchA | CLOCKS | 2007/12/25 18:10 |
| 0003 | 001 | KensakuB | 2008 OR 2009 | 2007/12/26 9:18 |
| ... | ... | ... | ... | ... |

FIG. 9

TLJ

| JOB NUMBER | JOB REGISTRATION DATE AND TIME | URL | STATUS | SEARCH CONDITION PRESENT/ABSENT | SEARCH CONDITION NUMBER |
|---|---|---|---|---|---|
| 1022 | 2007/08/04 12:00 | | FINISHED | ABSENT | |
| 1023 | 2007/09/20 15:30 | http://***.co.jp | PROCESSING | PRESENT | 005 |
| 1024 | 2007/09/20 15:36 | | STANDBY | ABSENT | |
| ... | ... | ... | ... | ... | ... |

FIG. 12

| JOB NUMBER | JOB REGISTRATION DATE AND TIME | URL | STATUS | SEARCH CONDITION PRESENT/ABSENT | SEARCH CONDITION NUMBER |
|---|---|---|---|---|---|
| 1022 | 2007/08/04 12:00 | | FINISHED | ABSENT | |
| 1023 | 2007/09/20 15:30 | http://***.co.jp | PROCESSING | PRESENT | 005 |
| 1024 | 2007/09/20 15:36 | | STANDBY | ABSENT | |
| ... | ... | ... | ... | ... | ... |

RC

GMD

PRINTING SYSTEM, IMAGE FORMING APPARATUS, WEB PAGE PRINTING METHOD, AND COMPUTER-READABLE STORAGE MEDIUM FOR COMPUTER PROGRAM

This application is based on Japanese Patent Application No. 2008-157262 filed on Jun. 16, 2008, the contents of which are hereby incorporated by reference.

BACKGROUND OF THE INVENTION

1. Field of the Invention

The present invention relates to an image forming apparatus having a function for browsing web pages, and to a method for printing web pages in the image forming apparatus.

2. Description of the Related Art

It has become common to browse web pages using a terminal such as a personal computer, send the web pages to an image forming apparatus such as a printer or multi-function peripheral, and print the web pages. A conventional method for assisting operations for such printing of web pages has been proposed in JP 2006-285461A (called "Patent Document 1" hereinafter).

According to the method of Patent Document 1, the URL (Uniform Resource Locator) in the web server when printing an HTML page and the print parameter values of the web server designated by the HTML page are stored, and are then reused when printing that same HTML page, thereby eliminating the need for a user to remember those settings.

However, there are situations, such as the one described below, where a user who printed a web page also wishes to print web pages that are related to that original web page.

First, the user operates his/her own terminal, and searches for a web page s/he wishes to print. To be more specific, the user accesses a web site that provides a search service (known as a "search engine") using a web browser installed in the terminal and designates a keyword thought to be related to the web page s/he wishes to print, thereby causing the search engine to execute a search process. The user then finds the hyperlink of a desired web page from among the search results and clicks on that hyperlink, thereby accessing the web page; the user then prints the web page using the image forming apparatus. The user then travels to the image forming apparatus to pick up the printed matter. However, there are cases where the user then wishes to print other web pages shown in the search results while at the image forming apparatus.

In such a case, it is necessary for the user to return to his/her terminal, find one of the other web pages from among the search results, access that other web page, print that other web page using the image forming apparatus, and then return to the image forming apparatus to pick up the printed matter once again.

If the image forming apparatus is located far away from the terminal, such operations are extremely cumbersome for the user. Of course, if the image forming apparatus is equipped with a web browser, it is conceivable that the image forming apparatus could be used to once again access the search engine, designate a keyword, perform a search, obtain the same search results, and print; however, the operational panel in an image forming apparatus has less operational flexibility than a terminal, and thus these operations are complicated for the user. Furthermore, if there were multiple designated keywords, or the keyword was complex, it is difficult to recreate the search conditions.

SUMMARY

Having been conceived in light of such problems, it is an object of the present invention to make it easier to perform printing operations when printing web pages related to a printed web page than was conventionally possible.

According to an aspect of the present invention, a printing system includes a terminal configured to be connected to a search engine, and an image forming apparatus configured to be connected to the search engine and the terminal, and to have a printer. The terminal includes a conditional expression accepting portion accepting a conditional expression based on which a search is performed, a first result receiving portion causing the search engine to search for a web page based on the conditional expression accepted by the conditional expression accepting portion, and receiving, from the search engine, a search result page indicating one or more hit pages that are web pages searched by the search engine, a first result displaying portion displaying the search result page received by the first result receiving portion, a first hit page obtaining portion obtaining a hit page selected from among the hit pages indicated in the search result page received by the first result receiving portion, and a print command portion issuing, to the image forming apparatus, a command to print the hit page obtained by the first hit page obtaining portion, and sending the conditional expression accepted by the conditional expression accepting portion to the image forming apparatus. The image forming apparatus includes a first print controller causing the printer to print the hit page obtained by the terminal in accordance with the command issued from the terminal, a second result receiving portion causing the search engine to search for a web page based on the conditional expression sent from the terminal, and receiving the search result page from the search engine, a second result displaying portion displaying the search result page received by the second result receiving portion, a second hit page obtaining portion obtaining a hit page selected from among the hit pages indicated in the search result page received by the second result receiving portion, and a second print controller causing the printer to print the hit page obtained by the second hit page obtaining portion.

BRIEF DESCRIPTION OF THE DRAWINGS

FIG. 8 is a diagram illustrating an example of a search condition table.

FIG. 9 is a diagram illustrating an example of a print job list table.

FIG. 12 is a diagram illustrating an example of a print job list window.

DESCRIPTION OF THE PREFERRED EMBODIMENTS

Figure 1:
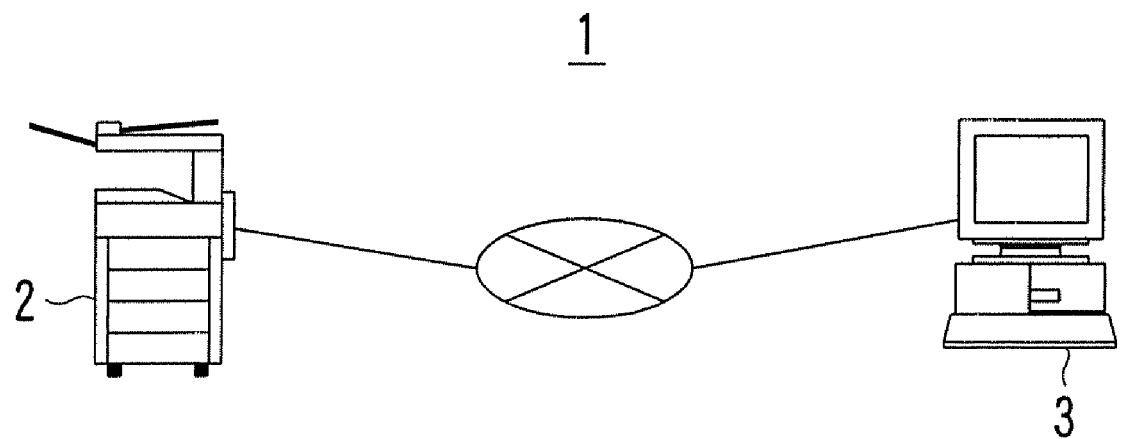
FIG. 1 is a diagram illustrating an example of the configuration of a printing system according to an embodiment of the present invention.
Figure 2:
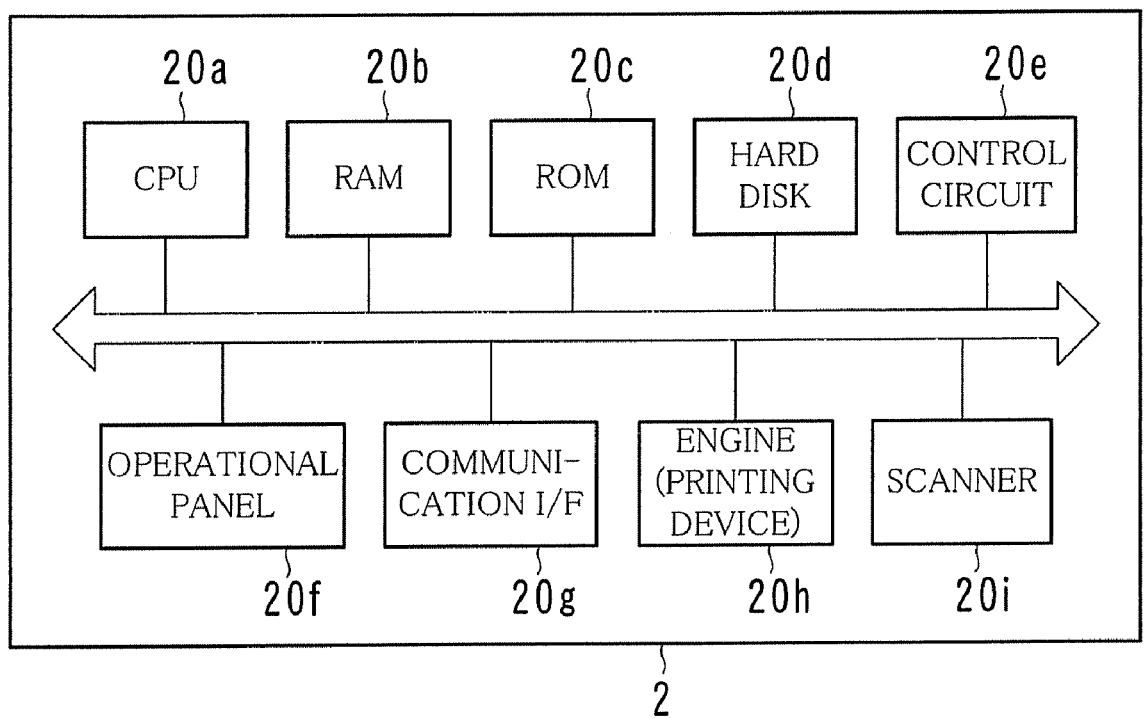
FIG. 2 is a diagram illustrating an example of the hardware configuration of an image forming apparatus.
Figure 3:
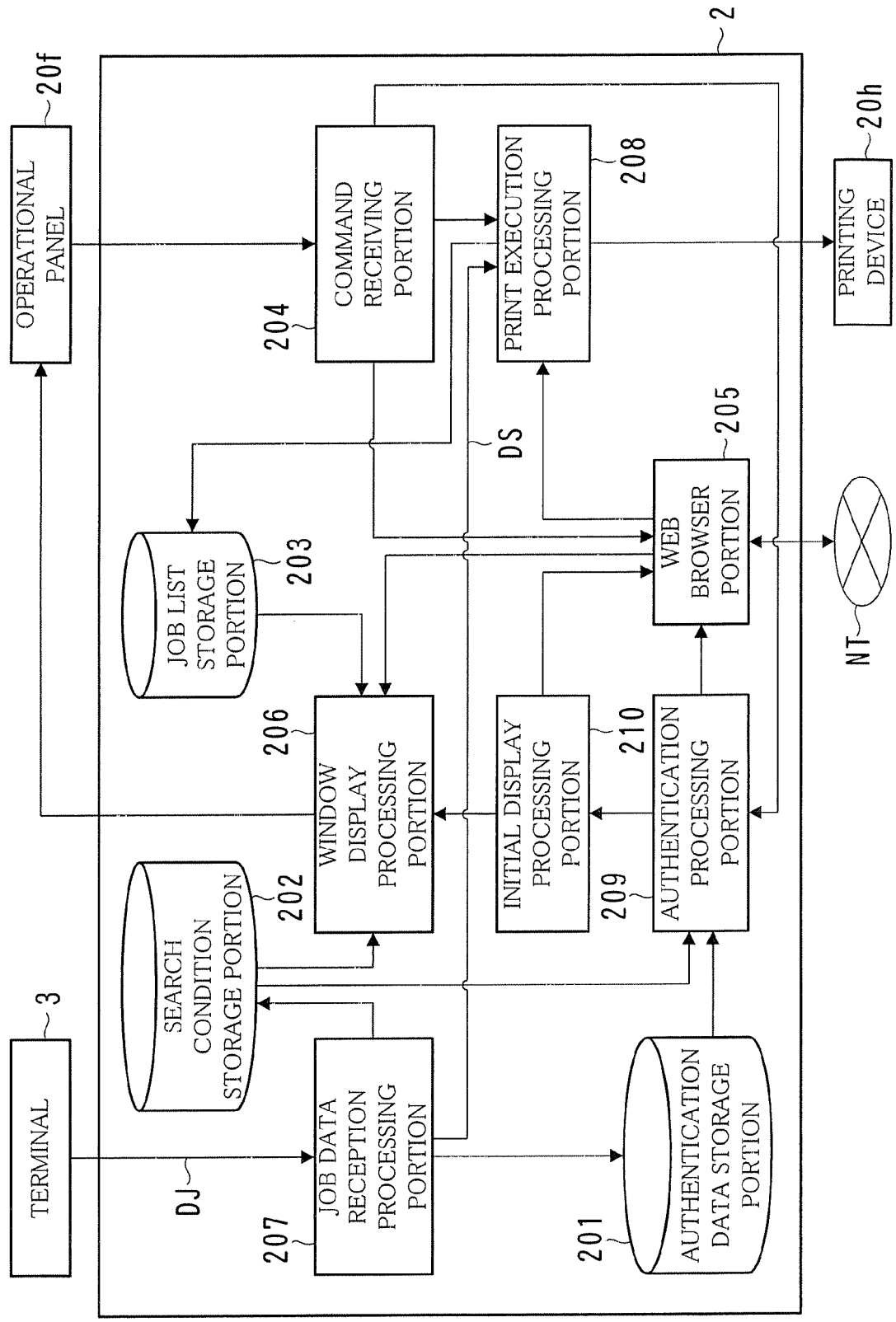
FIG. 3 is a diagram illustrating an example of the functional configuration of an image forming apparatus.
Figure 4:
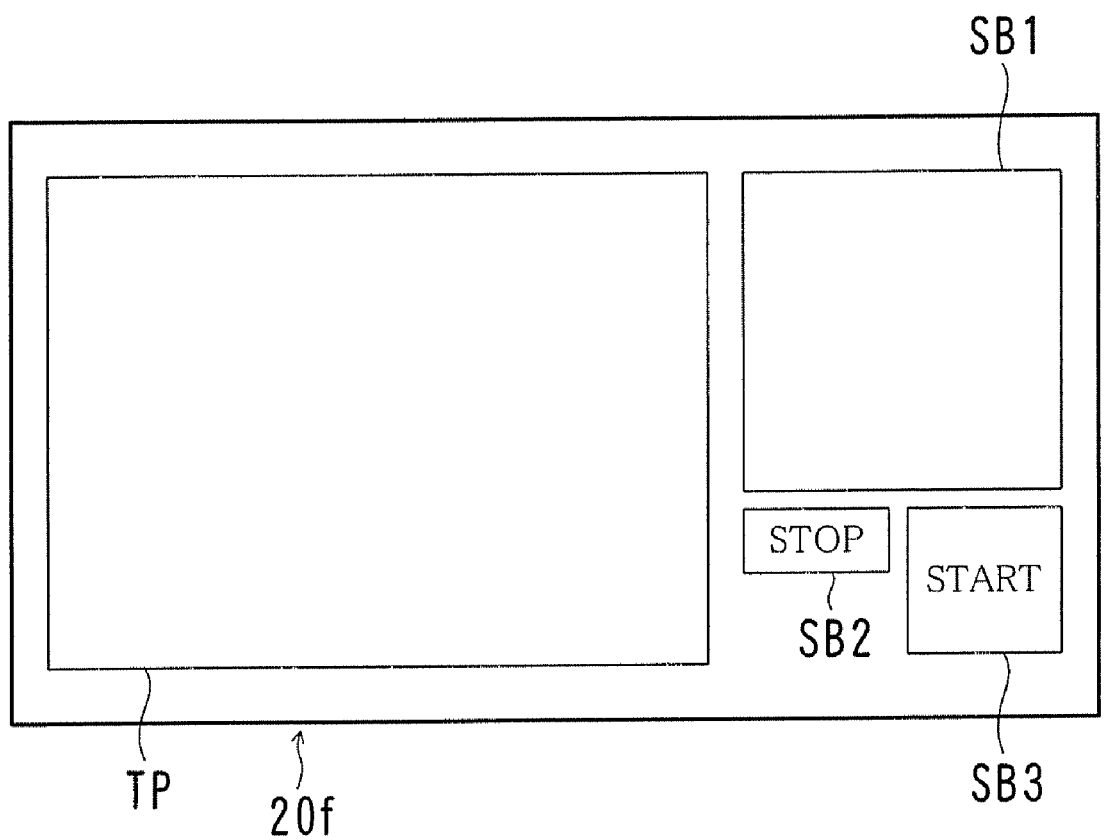
FIG. 4 is a diagram illustrating an example of an operational panel.
Figure 5:
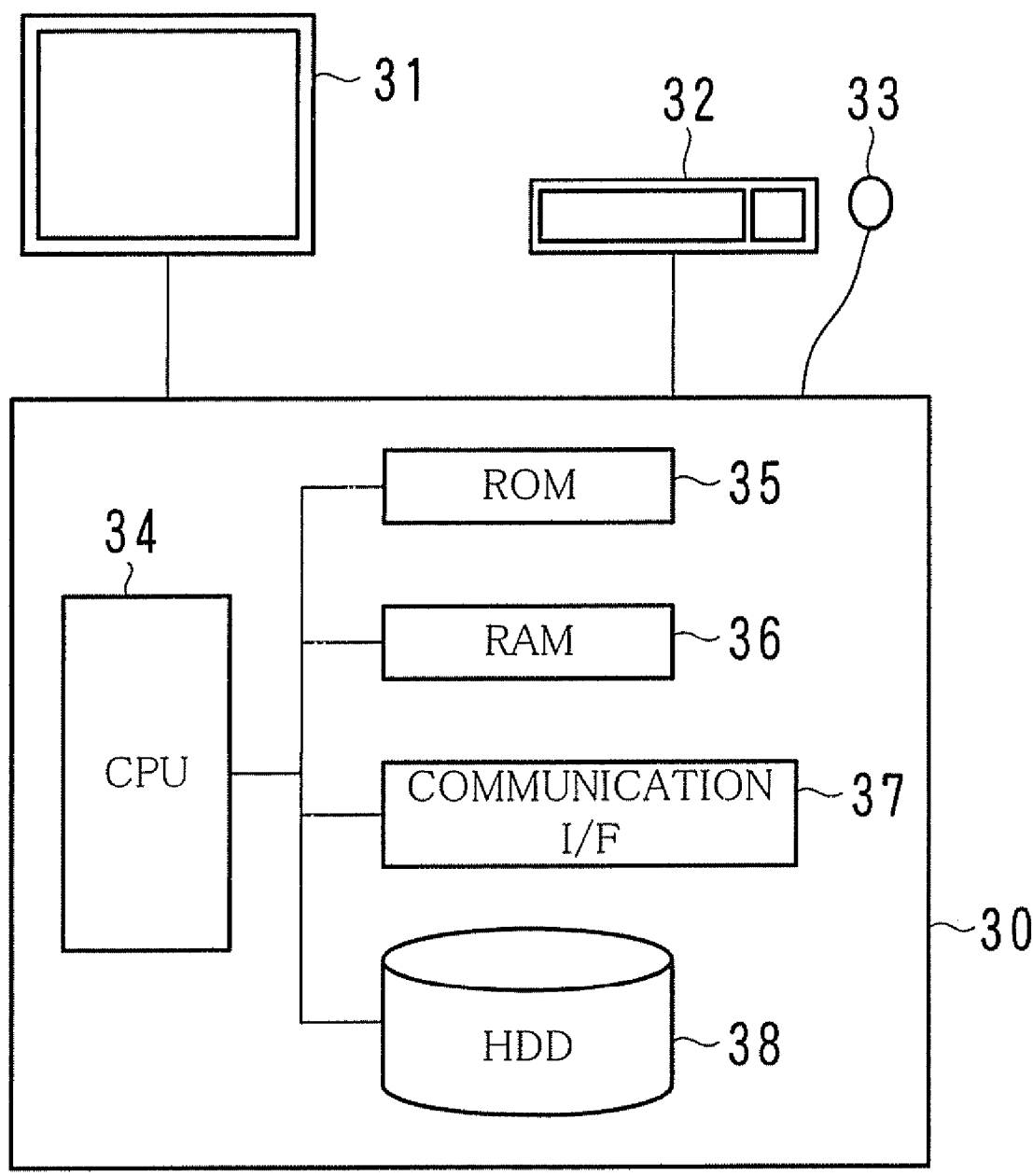
FIG. 5 is a diagram illustrating an example of the hardware configuration of a terminal.
Figure 6:
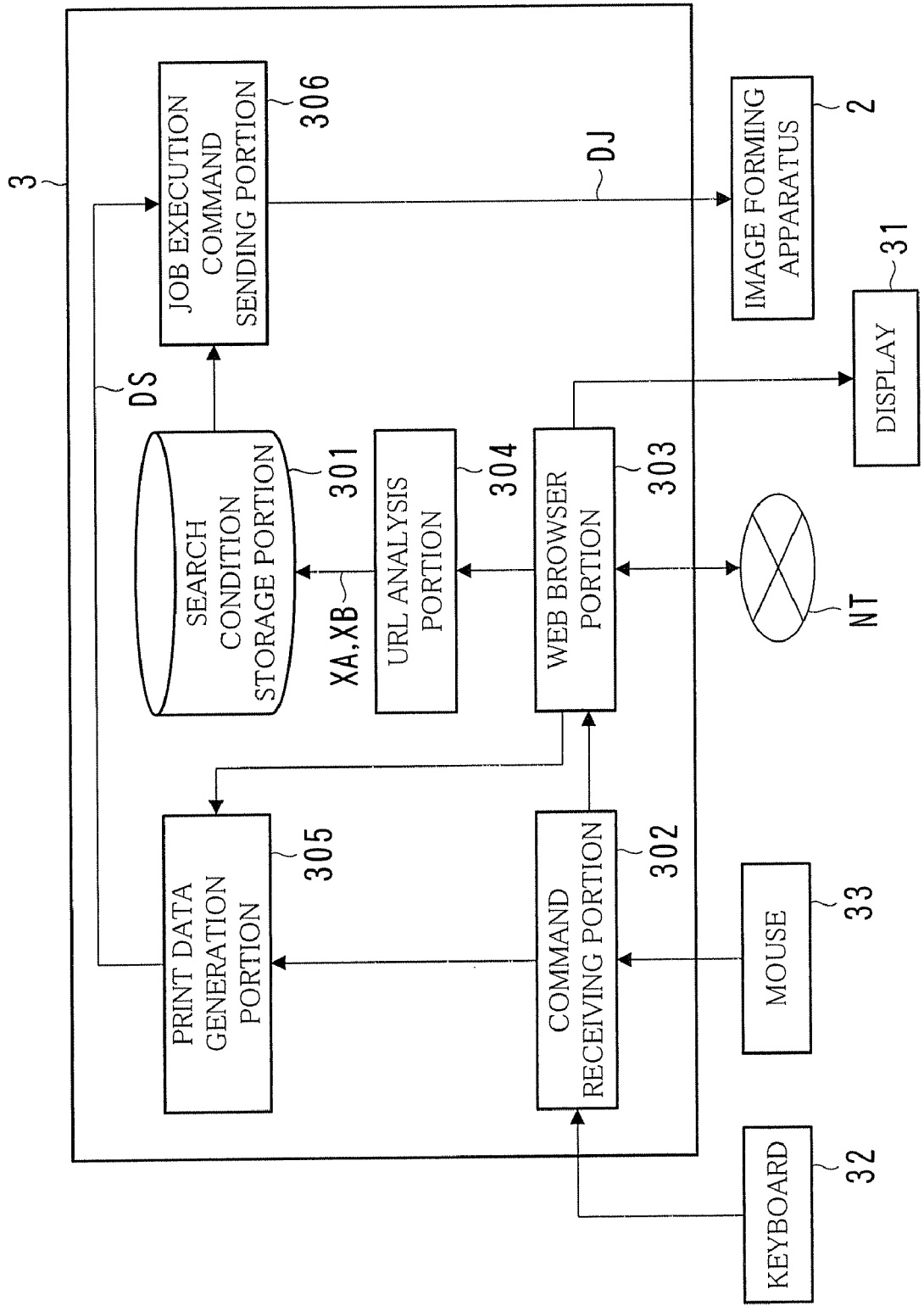
FIG. 6 is a diagram illustrating an example of the functional configuration of a terminal.

FIG. 1 is a diagram illustrating an example of the configuration of a printing system 1 according to an embodiment of the present invention; FIG. 2 is a diagram illustrating an example of the hardware configuration of an image forming apparatus 2; FIG. 3 is a diagram illustrating an example of the functional configuration of the image forming apparatus 2; FIG. 4 is a diagram illustrating an example of an operational panel 20f; FIG. 5 is a diagram illustrating an example of the hardware configuration of a terminal 3; and FIG. 6 is a diagram illustrating an example of the functional configuration of the terminal 3.

As shown in FIG. 1, the printing system 1 is configured of the image forming apparatus 2, the terminal 3, and so on. The image forming apparatus 2 and the terminal 3 can be connected to each other via a LAN. Each user that uses the printing system 1 is allocated, in advance, a user number for identifying that user.

The image forming apparatus 2 is an image processing apparatus that integrates a variety of functions, such as copying, scanning, faxing, network printing, document server functionality, file transfer functionality, and so on. Such devices are also sometimes called MFPs, or Multi-Function Peripherals.

Furthermore, web pages can be downloaded from various web sites on the Internet and displayed by using a browsing function. Furthermore, the displayed web pages can be printed. Note that the image forming apparatus is not limited to an MFP, and may also be a printer, facsimile device, or the like equipped with a browsing function.

As shown in FIG. 2, each image forming apparatus 2 is configured of a CPU 20a, a RAM 20b, a ROM 20c, a hard disk 20d, a control circuit 20e, the operational panel 20f, a communication interface 20g, a printing device 20h, a scanner 20i, and the like.

Programs and data for implementing an authentication data storage portion 201, a search condition storage portion 202, a job list storage portion 203, a command receiving portion 204, a web browser portion 205, a window display processing portion 206, a job data reception processing portion 207, a print execution processing portion 208, an authentication processing portion 209, and an initial display processing portion 210, as shown in FIG. 3, are stored in the hard disk 20d. These programs and data are loaded into the RAM 20b and the programs are executed by the CPU 20a as necessary. The processes of the flowcharts described later are also executed by the CPU 20a executing programs. Part or all of these programs or data may be stored in the ROM 20c. Alternatively, the functionality of some or all of the portions may be implemented solely by hardware such as the control circuit 20e.

The scanner 20i is a device that optically scans images such as photographs, characters, drawings, charts, and so on that are printed on a paper document and generates image data thereof.

The printing device 20h is a device that prints images onto paper based on image data obtained by the scanner 20i or data sent by the terminal 3 or the like.

The communication interface 20g is a NIC (Network Interface Card), modem, or the like for communicating with other apparatuses.

The control circuit 20e is a circuit for controlling devices such as the hard disk 20d, the scanner 20i, the printing device 20h, the communication interface 20g, the operational panel 20f, and so on.

The operational panel 20f is a device that a user uses to operate the image forming apparatus 2. As shown in FIG. 4, the operational panel 20f is configured of a touch panel TP, a numerical keypad SB1, a stop button SB2, a start button SB3, and so on. Hereinafter, the numerical keypad SB1, the stop button SB2, and the start button SB3 shall be collectively referred to as "input buttons SB". Other devices, members, data, or the like may also be collectively described in the same manner, with the numbers at the end of their reference numerals being omitted.

The input buttons SB are buttons for inputting print setting details, commands to execute or stop printing, and so on.

The touch panel TP is a display device for displaying windows by which the user operates the image forming apparatus 2, messages to the user, and so on, and is also an input device by which the user makes various inputs to the image forming apparatus 2. The user can, for example, input the URL (Uniform Resource Locator) of a web page or a conditional expression for searching by pressing an image of a keyboard displayed in the touch panel TP.

The terminal 3 has a web browser and can download and display web pages, allowing the user to browse those pages. Furthermore, the terminal 3 has drivers for the image forming apparatus 2, and can cause the image forming apparatus 2 to print images represented by image data stored in its own hard disk or the like, web pages obtained from the Internet, and so on. A personal computer, workstation, or the like can be used as the terminal 3.

As shown in FIG. 5, the terminal 3 is configured of a main portion 30, a display 31, a keyboard 32, a mouse 33, and the like.

The display 31 displays various windows, such as web browser window (called a "browser window GMB" hereinafter), driver windows for the image forming apparatus 2, and so on in its display screen.

The keyboard 32 and mouse 33 are input devices through which the user provides commands to the terminal 3.

The main portion 30 is configured of a CPU 34, a ROM 35, a RAM 36, a communication interface 37, a hard disk 38, and so on.

Programs and data for implementing a search condition storage portion 301, a command receiving portion 302, a web browser portion 303, a URL analysis portion 304, a print data generation portion 305, a job execution command sending portion 306, and so on, as shown in FIG. 6, are stored in the hard disk 38. These programs and data are loaded into the RAM 36 and the programs are executed by the CPU 34 as necessary. Part or all of these programs or data may be stored in the ROM 35. Alternatively, the functionality of some or all of the portions may be implemented solely by hardware. Note that part of the processing performed by the web browser portion 303 is implemented by a web browser. In addition, some of the processing performed by the print data generation portion 305 is implemented by the drivers of the image forming apparatus 2.

The communication interface 37 is a NIC for communicating with other apparatuses.

Next, the processes performed by the various portions of the terminal 3 as shown in FIG. 6 and the image forming apparatus 2 as shown in FIG. 3 shall be described in detail.

(Processing when User Operates Terminal 3 and Uses Image Forming Apparatus 2)

Figure 7:
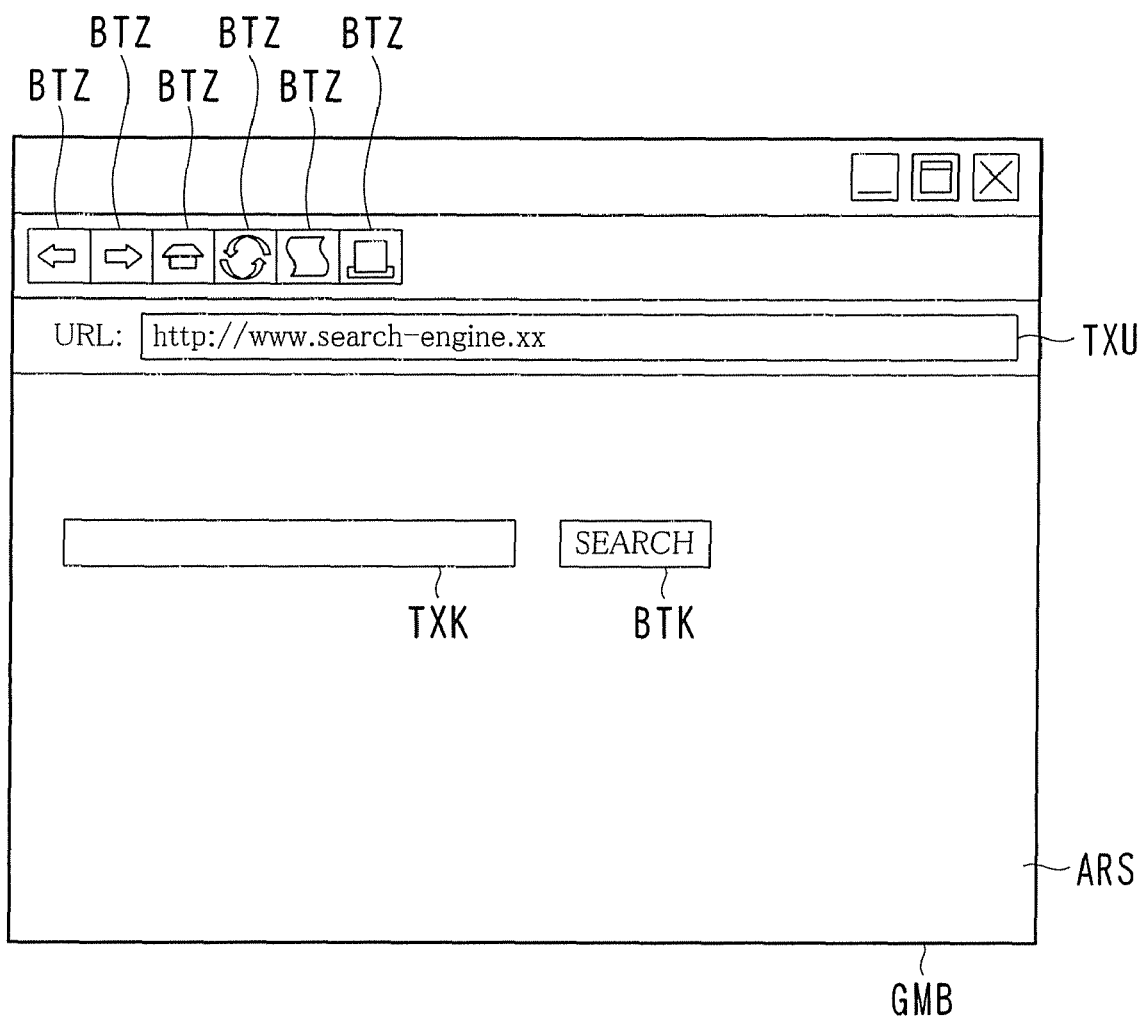
FIG. 7 is a diagram illustrating an example of a browser window.

FIG. 7 is a diagram illustrating an example of a browser window GMB; FIG. 8 is a diagram illustrating an example of a search condition table TLK; and FIG. 9 is a diagram illustrating an example of a print job list table TLJ.

The search condition storage portion 301 of the terminal 3 in FIG. 6 stores search log data XA and hit page obtainment log data XB, which shall be described later.

The command receiving portion 302 receives commands inputted to the terminal 3 by the user through the keyboard 32 or the mouse 33, conditional expressions for searching for web pages, or the like.

The web browser portion 303 downloads various web pages via the Internet and causes those pages to be displayed in the display 31. To be more specific, the web browser portion 303 causes a browser window GMB made up of a web page display area ARS, a URL designation text field TXU, operational buttons BTZ, and the like, as shown in FIG. 7, to be displayed in the display 31. The web browser portion 303 then causes a web page to be downloaded based on the URL inputted into the URL designation text field TXU by the user, and causes that web page to be displayed in the web page display area ARS.

When the user inputs the predetermined URL of a web site that provides a search service, such as Google™ or Yahoo™ (also known as a "search engine"), the web browser portion 303 downloads, based on that URL, a web page for inputting a conditional expression for searching (called a "conditional expression input page" hereinafter), from the web server of that search engine. The result is displayed in the web page display area ARS.

As shown in FIG. 7, a conditional expression input text field TXK, for inputting a conditional expression for searching for web pages, and a search execution button BTK, for inputting a command to execute the search, are provided in the conditional expression input page.

When inputting a conditional expression, the user can simply designate a single keyword, or designate a series of several keywords using the logical operators "AND" or "OR", such as "printer AND toner" or "computer OR keyboard".

When the user inputs a conditional expression and presses the search execution button BTK, the inputted conditional expression is sent to the web server of a search engine A, and in the web server, web pages that hit (correspond to) the conditional expression (called "hit pages" hereinafter) are searched for. A web page displaying a list of the hit pages (called a "search result page" hereinafter) is then sent from the web server. Upon receiving the search result page, the web browser portion 303 displays the search result page in the web page display area ARS.

When the user then selects a desired web page from the hit pages displayed in the list included in the search result page (that is, upon clicking a hyperlink), the web page that has been selected (called a "selected web page" hereinafter) is sent from the web server of that selected web page. Upon obtaining the selected web page, the web browser portion 303 displays that selected web page in the web page display area ARS.

Each time the web browser portion 303 obtains a web page, the URL analysis portion 304 checks whether or not the obtained web page is a search result page by analyzing the URL of that web page. If the obtained web page is a search result page, the URL analysis portion 304 further determines the search engine that provides that web page and the conditional expression used in the search. The processing performed by the URL analysis portion 304 shall be described in detail next.

In general, the URL of a search result page includes search engine identification information (called a "search engine name" hereinafter. This is normally a combination of server name and domain name, such as "www.search-engine.xx", in the present example; there are also cases where only a domain name is used) and the name of the conditional expression parameters (called a "parameter name" hereinafter; in the present example, "keyword"); furthermore, the content of the conditional expression is included after a "=" immediately following the parameter name (in the present example, "sale"). This results in, for example, "http://www.search-engine.xx/keyword?=sale". The search engine name of course differs depending on the search engine. The parameter name may also differ depending on the search engine.

Accordingly, search engine characteristic data, indicating the search engine and parameter names, is stored in advance on a search engine-by-search engine basis. The URL analysis portion 304 analyzes the URLs of web pages in the following manner, based on the search engine characteristic data.

The URL analysis portion 304 first analyzes whether or not a search engine name and parameter name of one of the search engines included in the search engine characteristic data is present in the web page URL. If both a search engine name and a parameter name are included, that web page is determined to be a search result page. If not even one of these names is included, the web page is determined not to be a search result page.

Furthermore, in the case where it has been determined that the web page is a search result page, the URL analysis portion 304 extracts the search engine name and conditional expression from the URL of that web page.

Note that when full-width characters, such as the Japanese hiragana, katakana, or kanji symbols, are included in the conditional expression (search keyword), the conditional expression is expressed as percent encoding, as exemplified by "%E3%81%99%E3%81%97".

The search engine name of the search engine that provided the search result page and the conditional expression specified by the analysis process performed by the URL analysis portion 304 are stored in the search condition storage portion 301 along with the URL of the search result page as the search log data XA. Hereinafter, this combination of search engine name and conditional expression shall be called a "search condition".

Meanwhile, when a desired hit page is selected from the search result page by the user and that hit page is downloaded by the web browser portion 303, the search condition of the search result page is stored in the search condition storage portion 301 along with the URL of the downloaded hit page as the hit page obtainment log data XB.

Using the keyboard 32 and mouse 33, the user can instruct the displayed hit page to be printed. Alternatively, the user can also instruct documents, images, or the like created using word processing software or the like to be printed.

The print data generation portion 305 generates print data DS, for causing the image forming apparatus 2 to print web pages, documents, or images designated to be printed, in the Page Description Language. If it is a web page that is to be printed, the print data DS is generated so that the URL of that web page is also displayed.

The job execution command sending portion 306 performs a process for sending job data DJ, for causing the image forming apparatus 2 to execute a job such as printing, to the image forming apparatus 2.

If the job whose execution has been instructed is a print job, the print data DS generated by the print data generation portion 305 and data including a user number for the user who is using the terminal 3 are sent to the image forming apparatus 2 as job data DJ. This user number is inputted by the user when s/he logs in to the terminal 3.

However, in the case where it is a web page that is to be printed, and search log data XA or hit page obtainment log data XB indicating the URL of that web page is stored in the search condition storage portion 301, that search log data XA or hit page obtainment log data XB is also included in the job data DJ that is then sent. Note that descriptions regarding the sending of job data DJ for jobs aside from print jobs shall be omitted.

Hereinafter, job data DJ that includes search log data XA or hit page obtainment log data XB shall be referred to as "job data DJa", whereas job data DJ that includes neither shall be referred to as "job data DJb".

In FIG. 3, the authentication data storage portion 201 of the image forming apparatus 2 stores user numbers and passwords for each user of the printing system 1.

The search condition storage portion 202 stores a search condition table TLK, as shown in FIG. 8. The search condition and user number indicated in the job data DJa that has been sent from the terminal 3, or a search condition inputted by a user through the operational panel 20f and the user number of that user, are included in the search condition table TLK.

Each time job data DJa is received from the terminal 3, the search condition storage portion 202 issues a search condition number to the search condition indicated in that job data DJa in order to distinguish that search condition from the search conditions in other job data DJa. The search condition and user number indicated in the received job data DJa is then stored (registered) in the search condition table TLK in association with the issued search condition number. Furthermore, the date and time at which the registration took place (registration date and time) is also stored.

The method for storing the search condition inputted by the user through the operational panel 20f shall be described in detail later.

The job list storage portion 203 stores a print job list table TLJ, in which is stored a record of the print jobs that the image forming apparatus 2 has been instructed to execute. As discussed earlier, the image forming apparatus 2 is instructed to execute printing as a result of the user operating the terminal 3 and inputting a command to execute the print. There are also cases where the user directly instructs the image forming apparatus 2 to execute the print by operating the operational panel 20f. As shown in FIG. 9, identification numbers for the print jobs that the image forming apparatus 2 has been instructed to execute (a job number), the date and time the jobs were registered (a job registration date and time), URLs, statuses, presence/absence of search conditions, and search condition numbers are stored in the print job list table TLJ. Each time printing is instructed, a record of that print job is stored.

"Status" indicates the status of the execution of that job. "Standby" indicates that that job is in a status in which it is standing by for execution. "Processing" indicates that the job is being executed. "Finished" indicates that the execution of the job has been completed.

If it is a web page that is to be printed, the URL of that web page is indicated in "URL". The URLs of web pages are included in the print data DS sent from the terminal 3 and used in the print job.

"Search condition presence/absence" indicates, when it is a web page that is to be printed, whether or not a search condition corresponding to that print job is stored in the search condition table TLK. If job data DJa has been received, the search condition indicated in that job data DJa is, as described earlier, stored in the search condition storage portion 202. Therefore, "present" is indicated in "search condition presence/absence" in the record for the job denoted in the job data DJa.

A search condition number for the search condition corresponding to the print job of that record is stored in "search condition number".

(Processing when User Operates Operational Panel 20f and Uses Image Forming Apparatus 2)

Figure 10:
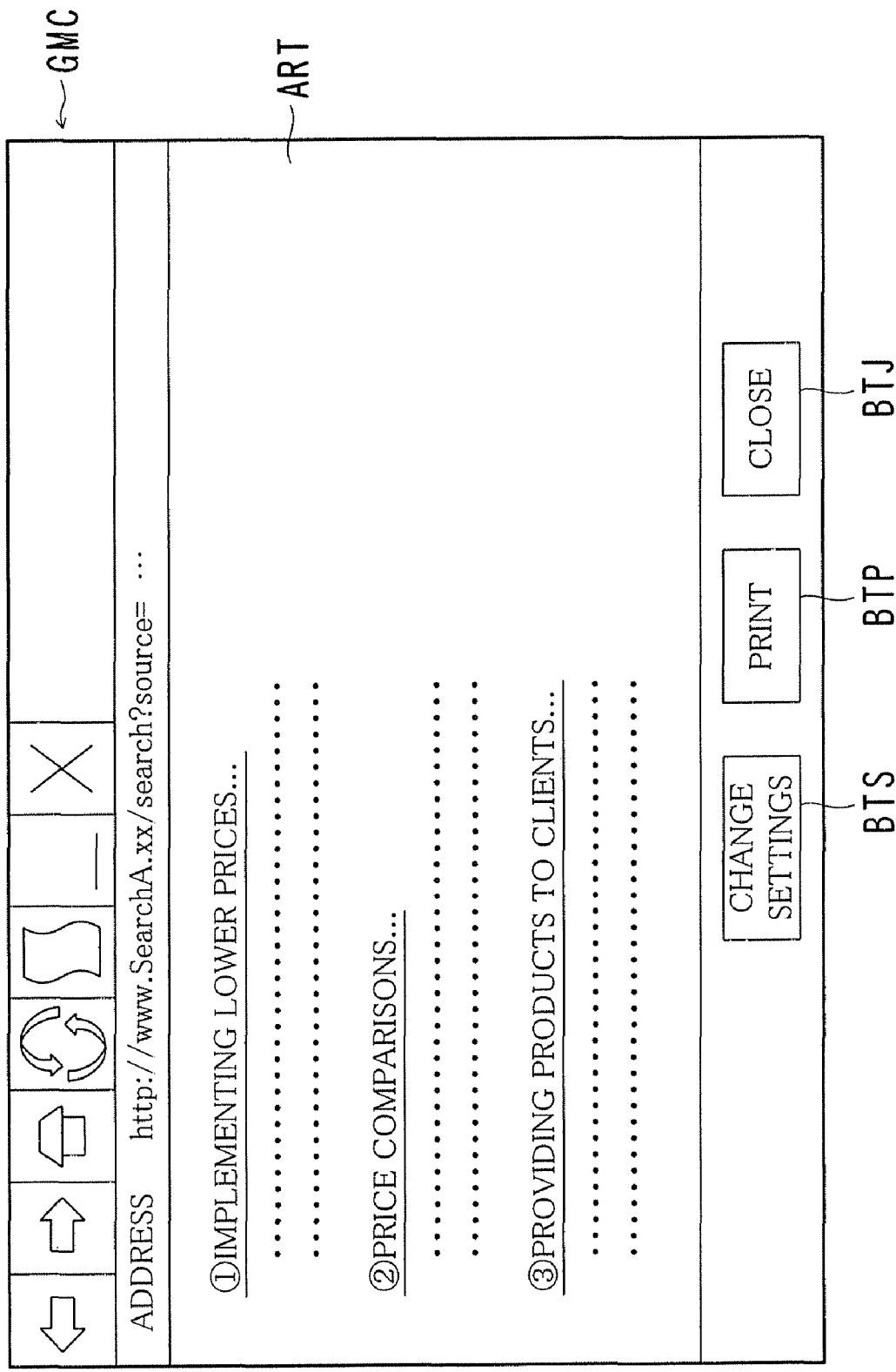
FIG. 10 is a diagram illustrating an example of a browser window.
Figure 11:
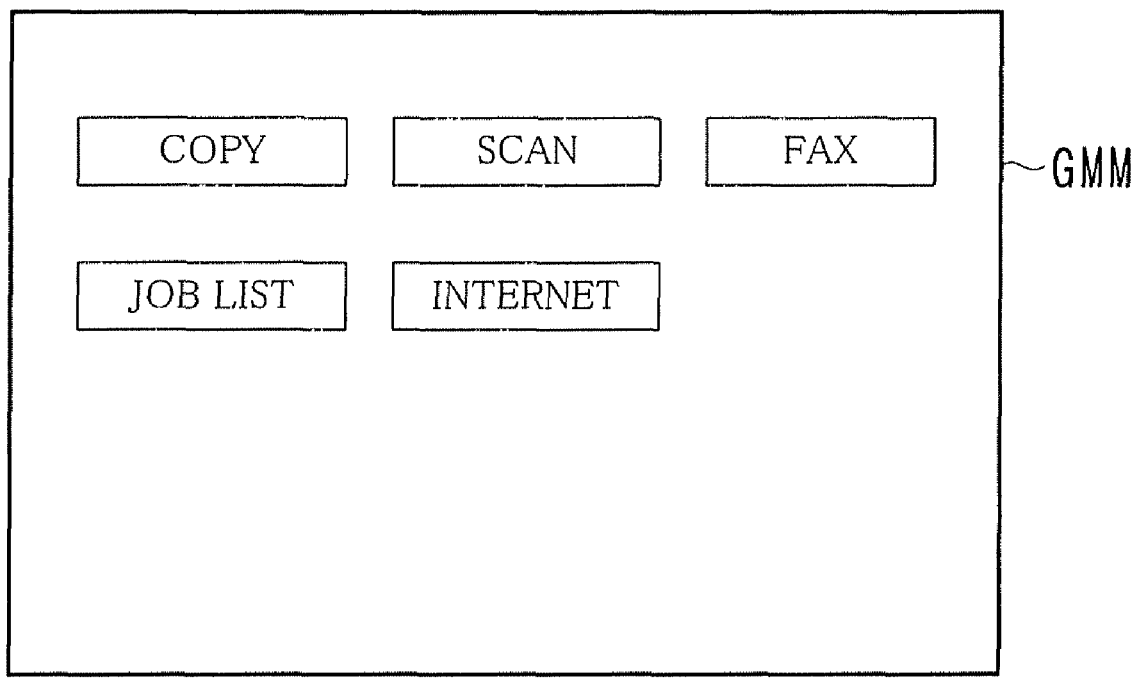
FIG. 11 is a diagram illustrating an example of a menu window.
Figure 13:
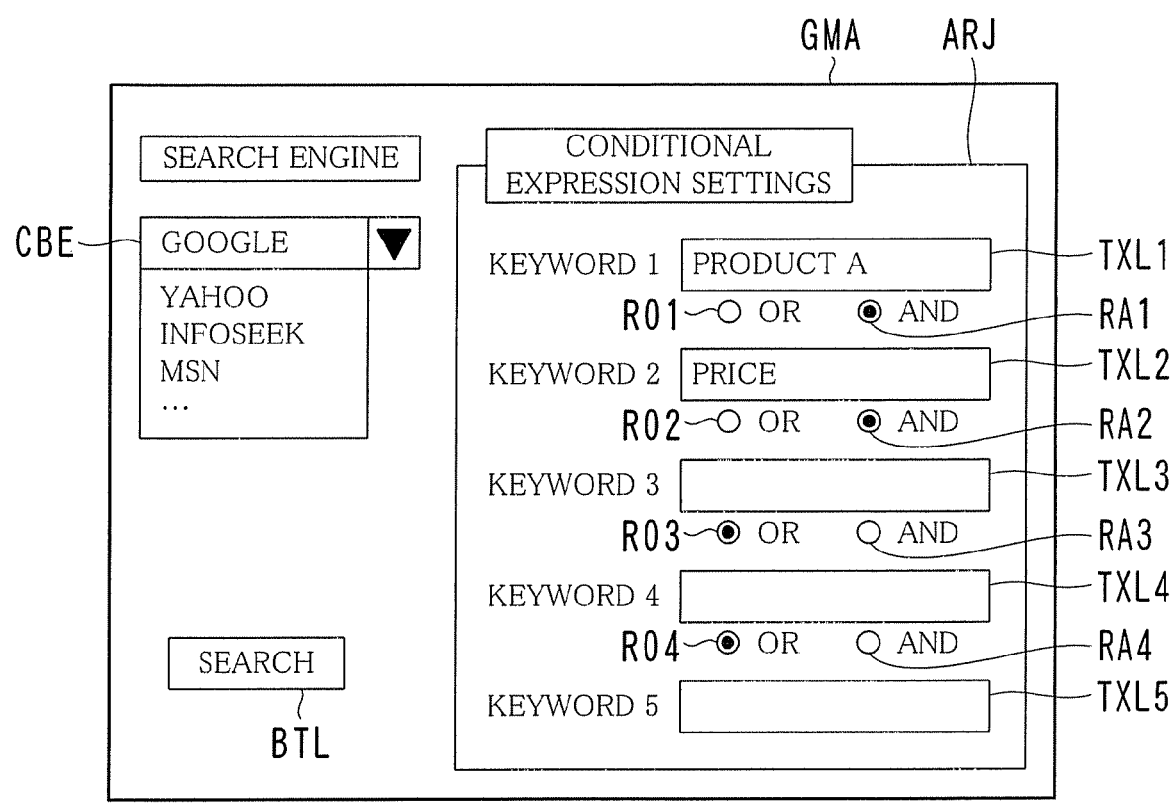
FIG. 13 is a diagram illustrating an example of a setting change window.

FIG. 10 is a diagram illustrating an example of a browser window GMC; FIG. 11 is a diagram illustrating an example of a menu window GMM; FIG. 12 is a diagram illustrating an example of a print job list window GMD; and FIG. 13 is a diagram illustrating an example of a setting change window GMA.

The command receiving portion 204 receives a command inputted by the user through the operational panel 20f. The web browser portion 205 downloads a web page from a web site on the Internet.

The window display processing portion 206 causes various windows by which the user operates the image forming apparatus 2 to be displayed in the touch panel TP. The window display processing portion 206 also causes web pages downloaded by the web browser portion 205 to be displayed in a web page display area ART of the browser window GMC, as shown in FIG. 10. The browser window GMC is displayed in the touch panel TP. Note that the various objects that make up the browser window GMC shall be described in order later.

The job data reception processing portion 207 receives job data DJ sent from the terminal 3, analyzes that job data DJ, and checks what type of job that data denotes.

If the received job data DJ denotes a print job, the job data reception processing portion 207 then checks whether or not search log data XA or hit page obtainment log data XB is included therein. In the case where such data is included in the job data DJ, the search condition indicated in the included search log data XA or hit page obtainment log data XB is stored in the search condition table TLK (see FIG. 8) in association with the user number included in that job data DJ. Furthermore, a job number is issued for the print job indicated in that job data DJ, and a record of that job is registered in the print job list table TLJ. The status of that record is set to "standby".

If the received job data DJ denotes a print job, the print execution processing portion 208 causes the printing device 20*h* to execute printing based on the print data DS included in that job data DJ. Furthermore, the print execution processing portion 208 updates the status of the job record registered in the print job list table TLJ to "processing". Then, when the print is completed, the print execution processing portion 208 updates the status to "finished".

The user who operated the terminal 3 and caused the image forming apparatus 2 to execute the print then travels to the image forming apparatus 2 to pick up the printed matter. There are cases where the user, having viewed the printed matter, wishes to alter the printing conditions, such as the darkness of the print or the size of the paper, and execute the print once again. If the user has printed a web page, there are also cases where s/he wishes to print a different web page related to the original web page. In such a case, the user can log in to the image forming apparatus 2 and cause such a print to be executed by directly operating the image forming apparatus 2 in the following manner.

When logging in to the image forming apparatus 2, the user enters his/her own user number and password using the operational panel 20*f*.

The authentication processing portion 209 authenticates that user by comparing the user number and password inputted by the user through the operational panel 20*f* with user numbers and passwords stored in the authentication data storage portion 201. If the authentication succeeds, the user is allowed to log in.

The initial display processing portion 210 performs processing related to the initial display of the touch panel TP following the completion of user authentication. This processing is carried out cooperatively by the web browser portion 205 and the window display processing portion 206, through a procedure such as that described below.

If the user having the user number indicated in that job data DJ logs in to the image forming apparatus 2 after a predetermined amount of time has passed following when the job data reception processing portion 207 receives job data DJ, the initial display processing portion 210 obtains the search condition stored in association with that user number from the search condition table TLK.

If there are multiple search conditions corresponding to the user number of the user who has logged in, the initial display processing portion 210 obtains the most recently registered search condition, based on the registration date and time. The web browser portion 205 is then instructed to execute a search based on the obtained search condition.

In accordance with an instruction from the initial display processing portion 210, the web browser portion 205 performs a process for automatically obtaining a search result page that corresponds to the search condition (an automatic download process).

To be more specific, the web browser portion 205 downloads the conditional expression input page of the search engine whose search engine name is in the obtained search condition. The URLs of the conditional expression input pages of each search engine are stored in advance in a storage device, such as the hard disk 20*d*, in association with the search engine name.

Next, the text field for inputting the conditional expression and the button by which the user instructs the search to be executed included in the conditional expression input page are searched for. Furthermore, data that is to be sent to the web server of the search engine, in the case where the stated button is pressed in a state where the conditional expression included in the search condition instructed by the initial display processing portion 210 is inputted in the stated text field, is also sent to that web server. In other words, for example, the abovementioned conditional expression is sent to the web server as a parameter value indicating the text field. Upon doing so, a search is executed in the web server based on the sent conditional expression, and a search result page showing a list of web pages corresponding to that conditional expression is then sent by the web server.

The web browser portion 205 receives the search result page sent from the web server. Then, as shown in FIG. 10, the window display processing portion 206 causes the search result page to be displayed in the web page display area ART of the browser window GMC. The web page display area ART shall now be described.

The web pages downloaded by the web browser portion 205 are displayed in the web page display area ART. The user can instruct the image forming apparatus 2 to display linked web pages by pressing hyperlink areas present within the web page with his/her finger. When a hyperlink area is pressed, the web browser portion 205 downloads the linked web page. When the web page is downloaded, the window display processing portion 206 displays that web page in the web page display area ART.

However, if the user having the user number indicated in job data DJ logs in to the image forming apparatus 2 after a predetermined amount of time has passed following the job data reception processing portion 207 receiving that job data DJ, the initial display processing portion 210 instructs the window display processing portion 206 to display the menu window GMM. Upon doing so, the window display processing portion 206 causes the menu window GMM, as shown in FIG. 11, to be displayed in the touch panel TP.

As shown in FIG. 11, the menu window GMM includes a copy button, a scan button, a FAX button, a job list button, and an Internet button.

The copy, scan, and FAX buttons are buttons for the user to select copy, scanning, and fax transmission functions, respectively. When one of these buttons is pressed, the window display processing portion 206 causes a window for performing settings regarding the function corresponding to the pressed button to be displayed in the touch panel TP.

When the Internet button is pressed, the window display processing portion 206 causes the browser window GMC to be displayed in the touch panel TP.

When the job list button is pressed, the window display processing portion 206 causes the print job list window GMD, such as that shown in FIG. 12, indicating a list of the jobs registered in the print job list table TLJ (a print job list), to be displayed in the touch panel TP.

The content of the print job list table TLJ is shown in the print job list window GMD. If a row RC in which "search condition presence/absence" indicates "present" is selected in the print job list window GMD, the web browser portion 205 obtains the search condition indicated in the record of the search condition table TLK corresponding to the search condition number shown in the selected row RC, and downloads a search result page based on that search condition. This download is carried out through a method similar to the automatic download process described earlier. The window display processing portion 206 then causes the downloaded search result page to be displayed in the web page display area ART of the browser window GMC.

The user can select a desired hit page from the list of hit pages shown in the search result page by pressing the touch panel TP. When the user selects a hit page, the web browser portion 205 downloads that hit page. The window display processing portion 206 then causes the downloaded hit page to be displayed in the web page display area ART of the browser window GMC.

As shown in FIG. 10, a setting change button BTS, print button BTP, and a close button BTJ are also included in the browser window GMC, in addition to the web page display area ART.

After the setting change button BTS, print button BTP, or close button BTJ is pressed, the various portions in the image forming apparatus 2 execute processing such as that described hereinafter, in accordance with user operations.

When the print button BTP is pressed, the window display processing portion 206 temporarily hides the browser window GMC, and causes a window through which the user sets printing conditions to be displayed in the touch panel TP. When the user sets the printing conditions and instructs the print to be executed, the window display processing portion 206 once again displays the browser window GMC, and the print execution processing portion 208 causes the printing device 20h to print the web page being displayed in the web page display area ART.

Meanwhile, when the close button BTJ is pressed, the window display processing portion 206 closes the browser window GMC, and causes the menu window GMM shown in FIG. 11 to be displayed in the touch panel TP.

When the setting change button BTS is pressed, the window display processing portion 206 displays the setting change window GMA, such as that shown in FIG. 13, in the touch panel TP.

The setting change window GMA is a window for changing the search engine and conditional expression settings and re-doing the web page search.

As shown in FIG. 13, the setting change window GMA includes a search engine drop-down menu CBE, a search button BTL, and a conditional expression setting area ARJ.

The search engine drop-down menu CBE is a drop-down menu by which the user selects a search engine.

The conditional expression setting area ARJ is an area for setting the conditional expression. A keyword input text field TXL, an OR radio button RO, and an AND radio button RA are disposed in the conditional expression setting area ARJ. A keyword for a search can be inputted into the keyword input text field TXL, thereby setting a single-keyword conditional expression; alternatively, a conditional expression having multiple keywords using an AND condition or an OR condition can be set by using the OR radio button RO and the AND radio button RA.

In order to reduce the work for the user involved with the input, the search condition used in the web page search displayed immediately prior to the setting change button BTS being pressed in the browser window GMC is automatically inputted, as default values, into the search engine drop-down menu CBE, the keyword input text field TXL, the OR radio button RO, and the AND radio button RA when the setting change window GMA is displayed. If there is no such search condition, or in other words, if a web page has been downloaded not through a search using a search engine but rather by directly designating a URL, the setting change window GMA is displayed in a state where the search engine drop-down menu CBE, the keyword input text field TXL, the OR radio button RO, and the AND radio button RA are each blank.

The process for displaying the setting change window GMA in a state where a default search condition has been inputted is carried out in the following manner.

If a row RC is selected by the user in the print job list window GMD as shown in FIG. 12, as described earlier, the web browser portion 205 obtains the record of the search condition table TLK (see FIG. 8) corresponding to the search condition number shown in that row RC, and downloads a search result page based on the search condition indicated in that record. The window display processing portion 206 causes that search result page to be displayed in the browser window GMC. At this time, the window display processing portion 206 holds the search condition number of the search condition for that search result page. Thereafter, when the user presses the setting change button BTS in the browser window GMC, the window display processing portion 206 obtains the search condition indicated in the corresponding record in the search condition table TLK based on the held search condition number, and causes the setting change window GMA, with that search condition inputted as the default setting, to be displayed in the touch panel TP.

The search button BTL in FIG. 13 is a button by which the user instructs the image forming apparatus 2 to execute a search. When the search button BTL is pressed, the web browser portion 205 downloads a search result page based on the search condition set in the setting change window GMA. This download is carried out through a method similar to the automatic download process described earlier. The downloaded search result page is then displayed in the web page display area ART of the browser window GMC.

If a new search condition has been set in the setting change window GMA, and a search carried out based thereupon, the search condition storage portion 202 issues a search condition number for that search condition, and stores that search condition along with the user number of the user operating the image forming apparatus 2 in the search condition table TLK, in association with the issued search condition number. Furthermore, the date and time at which the registration took place (registration date and time) is also stored. A search condition inputted using the operational panel 20f is stored in the search condition table TLK in this manner.

Figure 14:
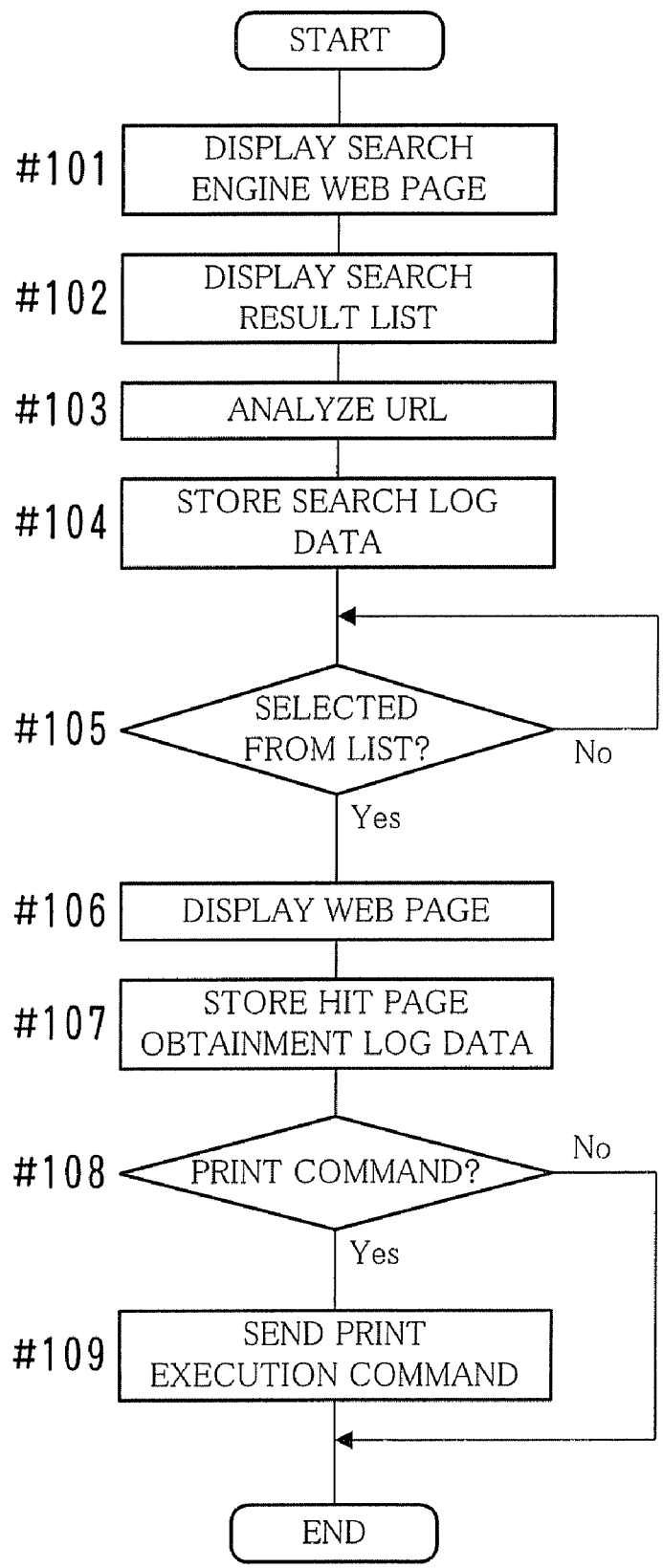
FIG. 14 is a flowchart illustrating a flow of processing performed by a terminal when a user browses a web page and instructs the web page to be printed.
Figure 15:
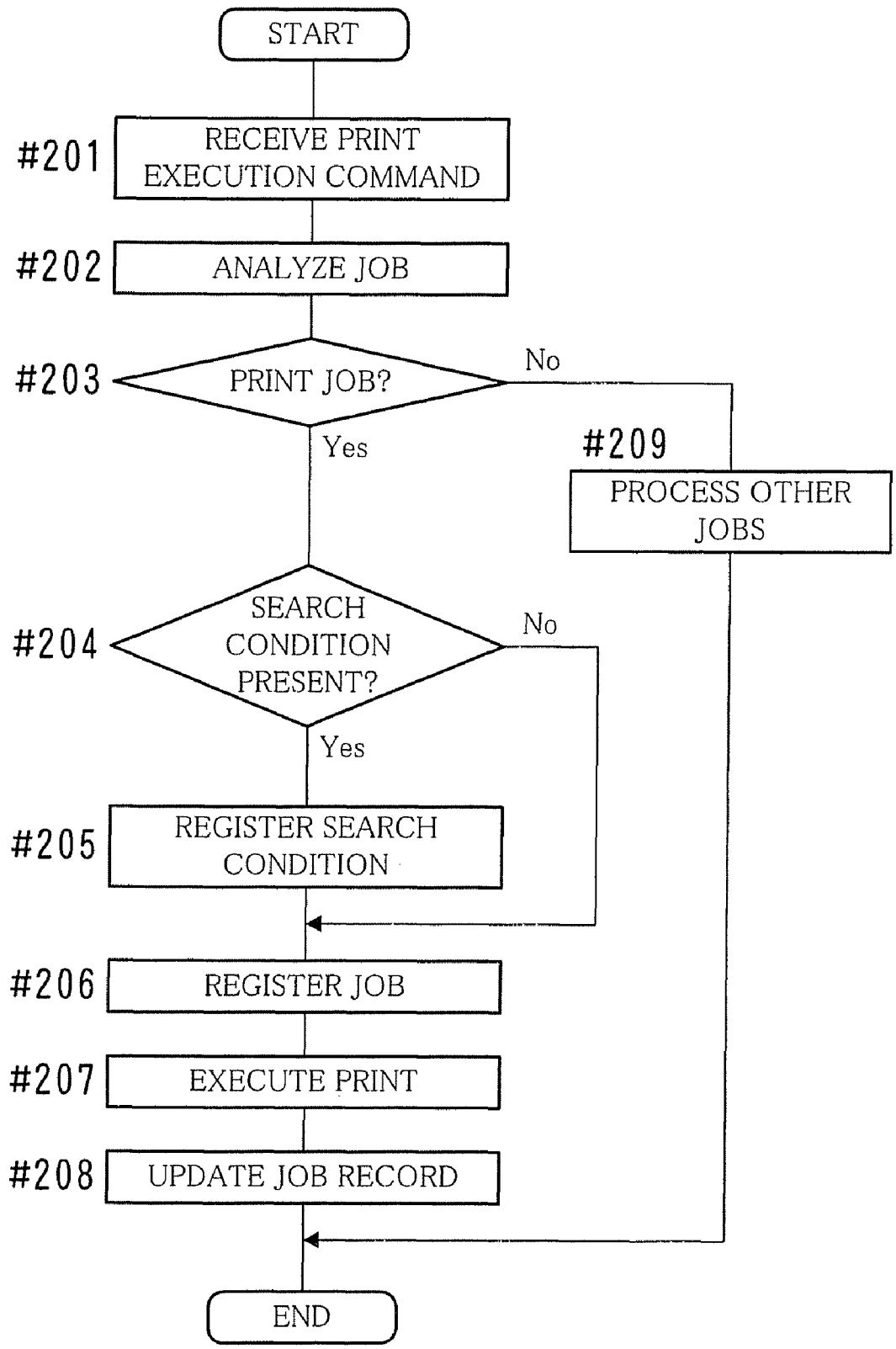
FIG. 15 is a flowchart illustrating a flow of processing performed by an image forming apparatus upon receiving a command to execute printing from a terminal.
Figure 16:
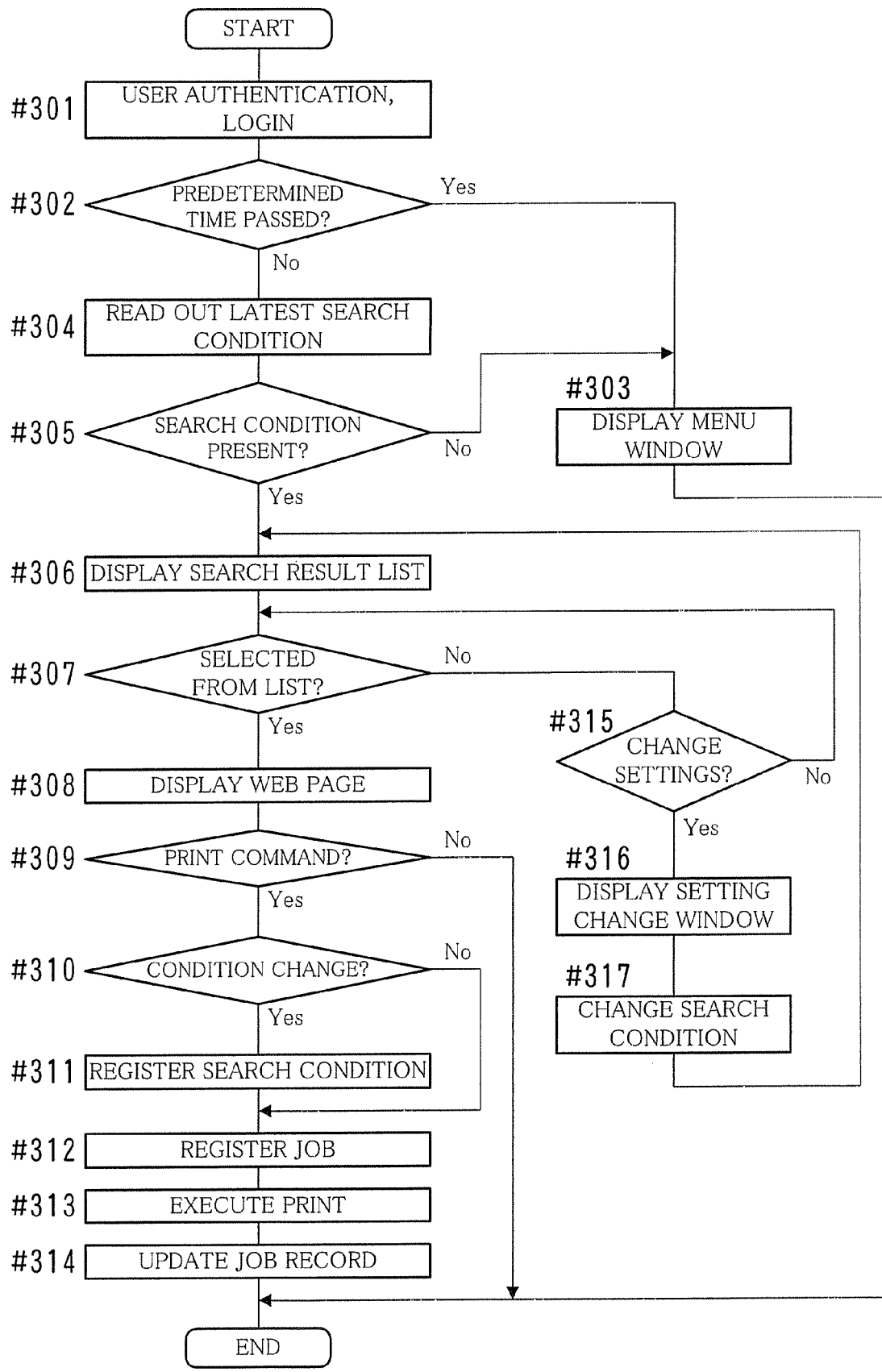
FIG. 16 is a flowchart illustrating a flow of processing performed by an image forming apparatus when a user operates the image forming apparatus directly and causes the apparatus to print a web page.

FIG. 14 is a flowchart illustrating a flow of processing performed by the terminal 3 when the user browses a web page and instructs the web page to be printed; FIG. 15 is a flowchart illustrating a flow of processing performed by the image forming apparatus 2 upon receiving a command to execute printing from the terminal 3; and FIG. 16 is a flowchart illustrating a flow of processing performed by the image forming apparatus 2 when the user operates the image forming apparatus 2 directly and causes the apparatus to print a web page.

A flow of processing for printing a web page, performed by the terminal 3 and the image forming apparatus 2, shall be described next with reference to FIGS. 14 to 16.

When the user performs an operation for launching a web browser using the terminal 3, the terminal 3 displays the browser window GMB (see FIG. 7) in the display 31. Then, when the user designates the URL of a search engine A in the browser window GMB, the terminal 3 downloads and displays the conditional expression input page of the search engine A (#101 in FIG. 14). The user inputs a conditional expression in the conditional expression input text field TXK in the conditional expression input page of the search engine A. Then, when the user presses the search execution button BTK, the terminal 3 sends the inputted conditional expression to the web server of the search engine A. In the web server, a web page search is executed based on the conditional expression that was sent. The terminal 3 then downloads the search result page, indicating the results of the search performed in the web server, from the web server, and displays that page in the display 31 (#102).

The terminal 3 then analyzes the URL of the search result page (#103). Through this, it is determined that the downloaded web page is a search result page and also belongs to the search engine A. The conditional expression indicated in the URL of the search result page is also detected. The search engine name of the detected search engine A, the detected conditional expression, and the URL of the search result page are stored as search log data XA (#104).

When the user selects a desired hit page from the search result page displayed in the display 31 (Yes in #105), the terminal 3 downloads that hit page (selected web page) and displays the page in the browser window GMB (#106). At this time, the URL of the selected web page is stored, along with the search condition used in the search for the displayed selected web page, or in other words, the search engine name and conditional expression stored earlier, as hit page obtainment log data XB (#107).

When the user then inputs a command to execute the print of the displayed selected web page to the terminal 3 (Yes in #108), the terminal 3 generates print data DS for printing that selected web page. The stored hit page obtainment log data XB, the print data DS, and the job data DJ including the user number of that user are then sent to the image forming apparatus 2 (#109). Note that if a command to execute printing of the search result page has been inputted, the search log data XA of that search result page, the print data DS for printing that search result page, and the job data DJ including the user number of the user are sent to the image forming apparatus 2.

The image forming apparatus 2 receives the job data DJ that has been sent from the terminal 3 (#201 in FIG. 15). The image forming apparatus 2 then determines what type of job the received job data DJ denotes by analyzing the job data DJ (#202). If print data DS is included in the job data DJ, it is determined that the job data DJ is for that print.

If it has been determined that the job data DJ is for the print job (Yes in #203), it is furthermore checked whether or not search log data XA or hit page obtainment log data XB is included in the job data DJ (#204). In the case where such data is included (Yes in #204), a record indicating the search condition shown in the included search log data XA or hit page obtainment log data XB and the user number included in the job data DJ is given a search condition number, and is then registered in the search condition table TLK (#205).

A record of the print job denoted in the received job data DJ is registered in the print job list table TLJ (#206). The search condition number issued in step #204 is stored in that record. Printing is then executed based on the print data DS included in the received job data DJ (#207). When the printing finishes, the status of the record for the registered print job is updated to "finished" (#208).

If it has been determined that the job data DJ denotes a job aside from printing (No in #203), that job is executed based on the job data DJ (#209).

After instructing the print to be executed, the user travels to the image forming apparatus 2 to pick up the printed matter. There are cases where the user, having viewed the printed matter, wishes to alter the printing conditions, such as the darkness or the size of the paper, and redo the print. There are also cases where the user wishes to print other web pages indicated in the search result page. In such a case, the user logs in to the image forming apparatus 2 and performs operations as follows. The image forming apparatus 2, meanwhile, performs processes in accordance with the user's operations, through a procedure such as that shown in FIG. 16.

When the user inputs his/her own user number and password using the operational panel 20f of the image forming apparatus 2, the image forming apparatus 2 performs a user authentication process using the inputted user number and password, and allows the user to log on if the authentication is a success (#301 in FIG. 16).

If the login is completed after a predetermined amount of time has passed following the last time that user operated the terminal 3 and instructed the image forming apparatus 2 to print a web page (Yes in #302), the image forming apparatus 2 displays a menu window GMM (see FIG. 11) in the touch panel TP (#303). When the user presses a button in the menu window GMM for selecting a function of the image forming apparatus 2, the image forming apparatus 2 displays a window for making settings for a function corresponding to that button. The image forming apparatus 2 then executes that function in accordance with the command inputted by the user.

If the login is completed before a predetermined amount of time has passed following the last time that user operated the terminal 3 and instructed the image forming apparatus 2 to print a web page (No in #302), the latest search condition stored in association with the user number of that user is read out from the search condition table TLK (#304).

A web page search is carried out based on the read-out search condition, and the resulting search result page is downloaded. The downloaded search result page is displayed in the touch panel TP (#306). Note that if no search condition associated with the user number of that user is stored (No in #305), the menu window GMM is displayed in the touch panel TP (#303).

When the user selects a desired hit page from the list of hit pages shown in the search result page (Yes in #307), the selected hit page (selected web page) is downloaded and displayed in the touch panel TP (#308).

When the user sets the print conditions and instructs the print to be executed (Yes in #309), the image forming apparatus 2 registers a record of that print job in the print job list table TLJ (#312) and executes the print (#313). When the printing finishes, the status of the record for that print job is updated to "finished" (#314).

When the setting change button BTS is pressed in the browser window GMC in which the search result page has been displayed as per step #306 (No in #307 and Yes in #315), the setting change window GMA is displayed in the touch panel TP (#316). When the user changes part of the search condition in the setting change window GMA and presses the search button BTL (#317), the image forming apparatus 2 downloads a search result page indicating a list of web pages corresponding to the conditional expression in the changed search condition, and displays that search result page in the touch panel TP (#306).

When the user selects a desired hit page from the list of hit pages shown in the search result page (Yes in #307), the image forming apparatus 2 downloads the selected hit page and displays that web page in the touch panel TP (#308). When the user inputs a command to execute a print (Yes in #309), the image forming apparatus 2 checks whether or not a new search condition has been set by the user through the setting change window GMA (#310).

If it has been determined that a new search condition has been set through the setting change window GMA in step #315 (Yes in #310), a search condition number is issued for that new search condition, and is registered in the search condition table TLK along with the user number of that user (#311). A record of the print job for which a command to execute has been inputted is registered in the print job list table TLJ (#312), after which the print is executed (#313). Note that the search condition number issued in step #311 is stored in the registered job record. When the printing finishes, the status of the record for that print job is updated to "finished" (#314).

According to the present embodiment, the user operates the terminal 3, selects a desired hit page from the list of hit pages indicated in the search result page, and causes the image forming apparatus 2 to print that hit page. If, after viewing the printed matter, the user wishes to change the print settings and redo the print once again, or wishes to print other hit pages indicated in the list along with the original hit page, s/he can operate the image forming apparatus 2 directly, causing the image forming apparatus 2 to execute the desired printing operation. This eliminates the need for the user to return all the way to his/her terminal 3 to perform operations, increasing the convenience.

Furthermore, if the user wishes to change the search condition and redo the web page search using the image forming apparatus 2, s/he can cause the setting change window GMA to be displayed therein, and change the settings for the search condition. Moreover, because the pre-change search condition is displayed as a default in the setting change window GMA, the user can easily change the search condition.

Although the process for analyzing the URL of the search result page and obtaining the search condition denoted therein is performed by the terminal 3 in the present embodiment, it should be noted that this process may be performed by the image forming apparatus 2 instead. In such a case, the URL of the search result page is sent from the terminal 3 to the image forming apparatus 2. The functionality of the URL analysis portion 304 is provided in the image forming apparatus 2, and thus the image forming apparatus 2 analyzes the sent URL and obtains the search condition.

In the present embodiment, if multiple search conditions corresponding to the user number of the logged-in user are registered, the most recently registered search condition is selected and the search result page is downloaded; however, the user may be allowed to select the search condition instead.

(Variation)

Next, a function for printing a QR (Quick Response) code that indicates a search condition used to search for web pages and a scheme for reading the search condition indicated in such a QR code and downloading a search result page shall be described.

Figure 17:
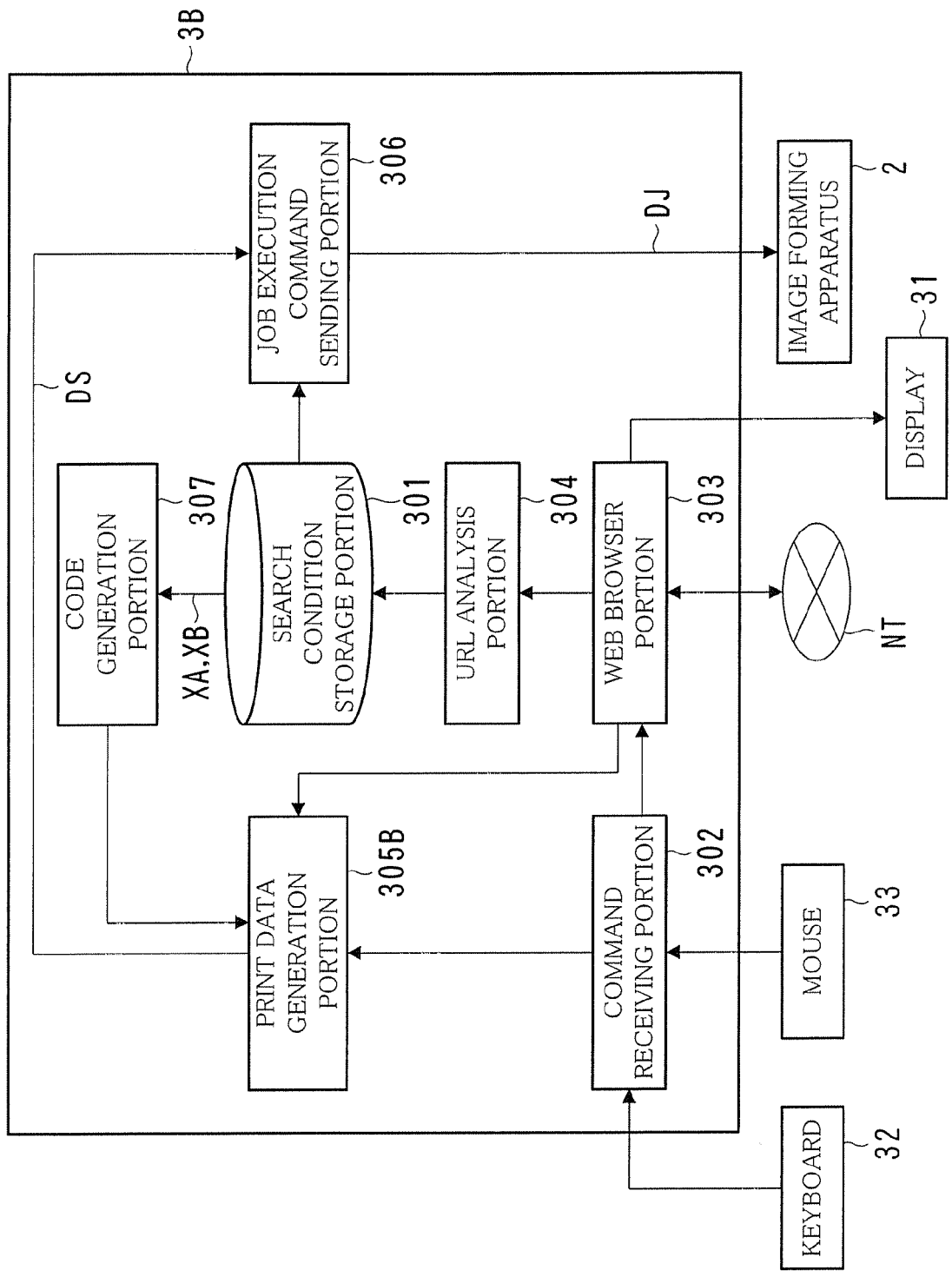
FIG. 17 is a diagram illustrating an example of the functional configuration of a terminal.
Figure 18:
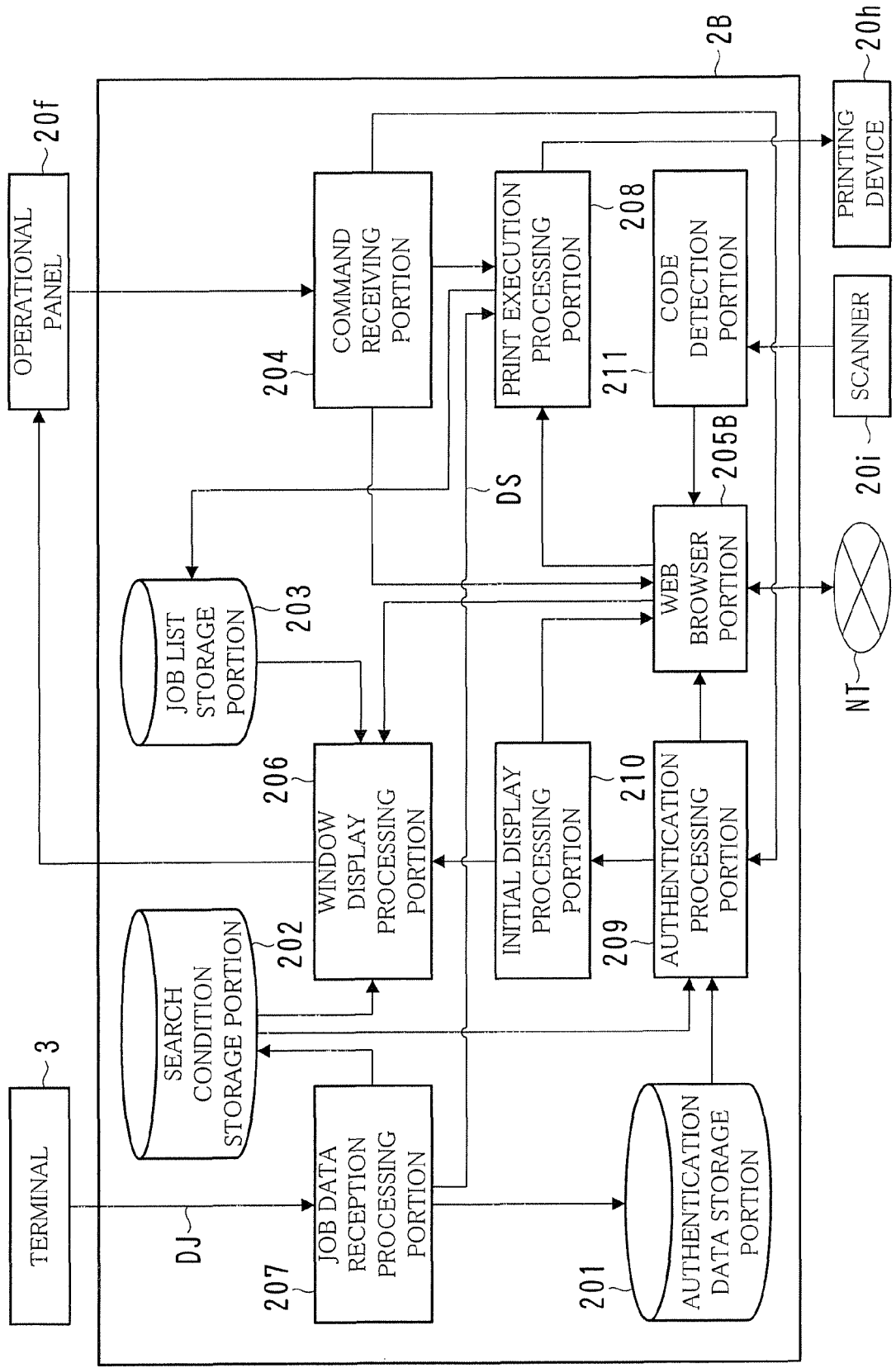
FIG. 18 is a diagram illustrating an example of the functional configuration of an image forming apparatus.
Figure 19:
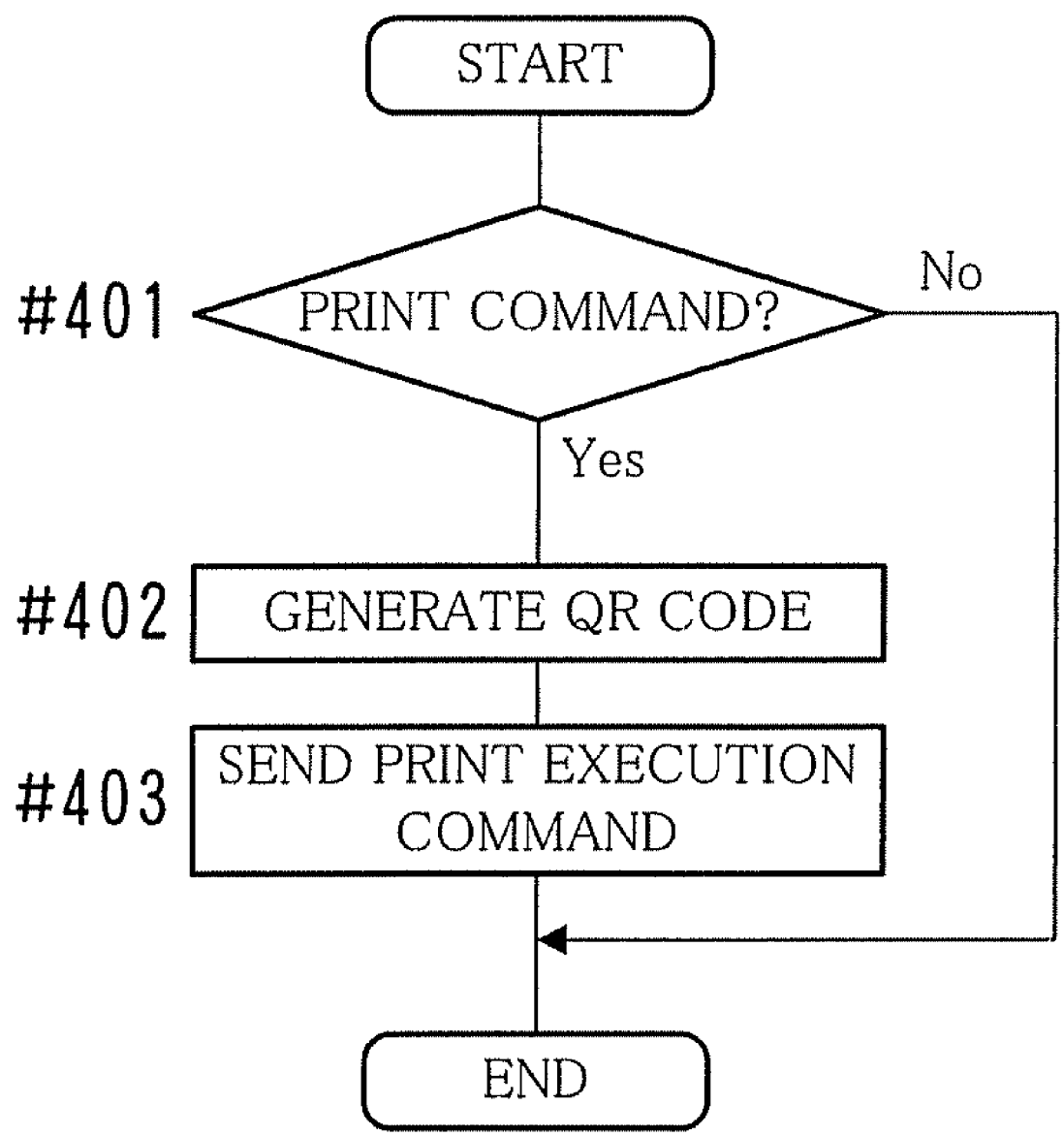
FIG. 19 is a flowchart illustrating a flow of processing performed by a terminal when printing a QR code.
Figure 20:
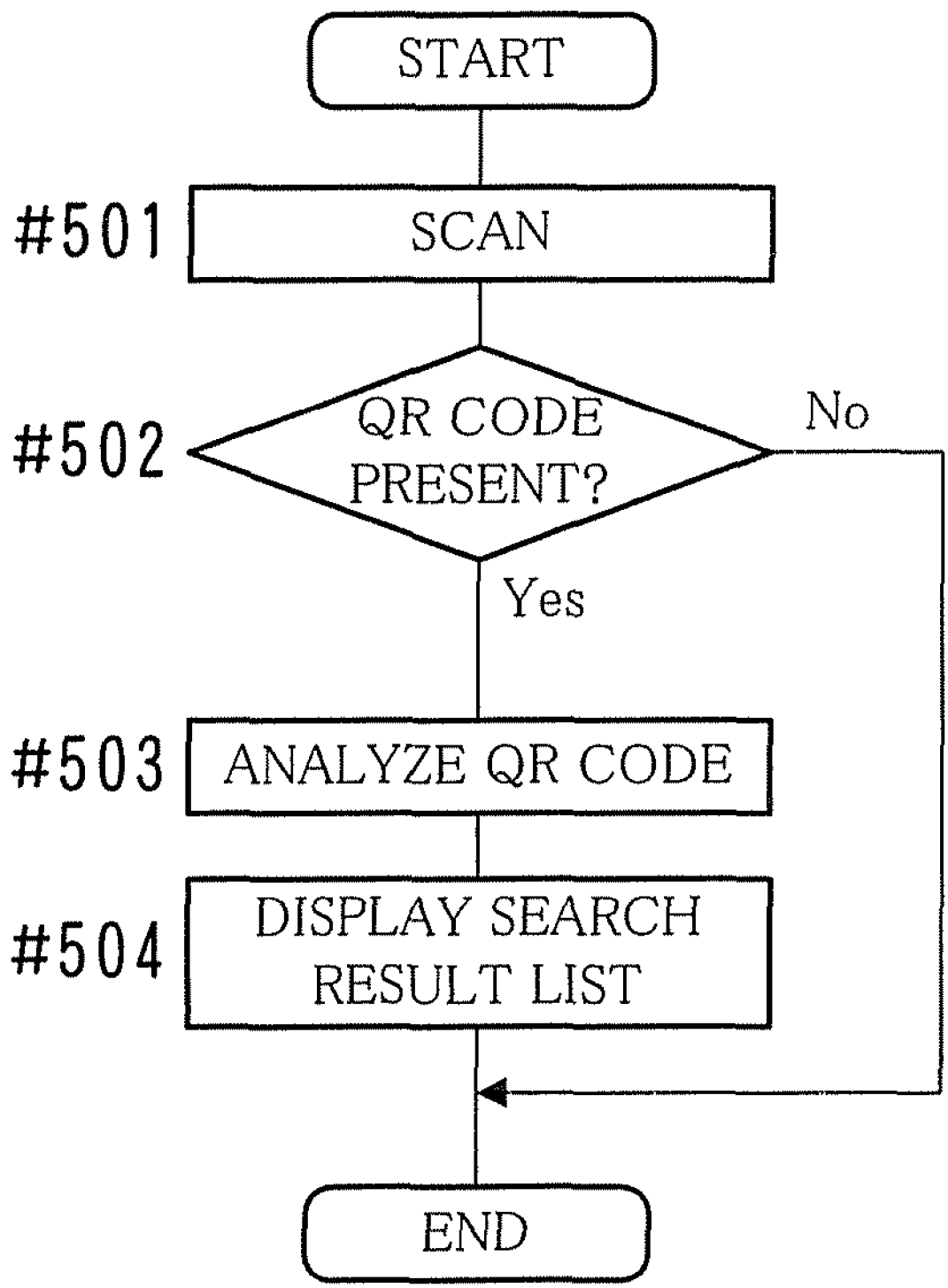
FIG. 20 is a flowchart illustrating a flow of processing performed by an image forming apparatus when reading a search condition in a QR code and downloading a search result page.

FIG. 17 is a diagram illustrating an example of the functional configuration of a terminal 3B; FIG. 18 is a diagram illustrating an example of the functional configuration of an image forming apparatus 2B; FIG. 19 is a flowchart illustrating a flow of processing performed by the terminal 3 when printing a QR code; and FIG. 20 is a flowchart illustrating a flow of processing performed by the image forming apparatus 2 when reading a search condition in a QR code and downloading a search result page.

The terminal 3 is configured as shown in FIG. 17. In other words, as can be seen by comparing FIG. 17 with FIG. 6, a code generation portion 307 has been added to the terminal 3. Furthermore, the image forming apparatus 2 is configured as shown in FIG. 18. In other words, as can be seen by comparing FIG. 18 with FIG. 3, a code detection portion 211 has been added to the image forming apparatus 2. Unless otherwise specified, items with the same reference numerals and names as those shown in FIGS. 3 and 6 have the same functions.

Hereinafter, a terminal 3 configured as shown in FIG. 17 shall be referred to as a "terminal 3B", whereas an image forming apparatus 2 configured as shown in FIG. 18 shall be referred to as an "image forming apparatus 2B".

When a user operates the terminal 3B and searches for a web page using a search engine, the search condition used in that search is stored in the search condition storage portion 301, as described earlier. Referring to the flowchart in FIG. 19, when a command to execute the printing of a web page searched for by the user is inputted, the code generation portion 307 shown in FIG. 17 obtains the search condition used in the search for that web page from the search condition storage portion 301, and generates data of a QR code (QR code data) indicating that search condition (#402).

A print data generation portion 305B generates print data DS for causing the image forming apparatus 2B to print the web page to be printed along with the QR code indicating the search condition for that web page. For example, print data DS for printing a web page across an entire sheet of paper, leaving a margin at the top, bottom, and sides of the paper, and printing a QR code in the lower-right portion of the margin of that paper, is generated.

The job execution command sending portion 306 sends job data DJ including the generated print data DS to the image forming apparatus 2B (#403). The image forming apparatus 2B executes the print based on the print data DS included in the job data DJ that has been sent, through the method described earlier. Through this, an image including a QR code is printed onto paper.

There are cases where another user, who has acquired the paper on which the image including the QR code has been printed, wishes to print other web pages related to the web page indicated on that paper. In such a case, that other user scans that paper using the scanner 20i.

Referring to FIG. 20, when the image of a set document is read by the scanner 20i (#501), the code detection portion 211 shown in FIG. 18 detects the QR code included in the image (Yes in #502), and obtains the search condition indicated in that QR code by analyzing the QR code (#503).

A web browser portion 205B downloads the search result page based on the obtained search condition. This download is carried out through a method similar to the automatic download process described earlier.

The window display processing portion 206 then causes the browser window GMB to be displayed in the touch panel TP, and causes the downloaded search result page to be displayed in the web page display area ART of the browser window GMB (#504).

According to this embodiment, reading a QR code with the scanner 20i makes it possible to browse a search result page, indicating a list of hit pages corresponding to the search condition indicated in that QR code, with ease. It is also easy to browse hit pages by selecting hyperlinks present in the search result page.

Furthermore, in a printing system that includes multiple image forming apparatuses 2, a search result page can be printed by an image forming apparatus 2 with ease using a QR code printed by another image forming apparatus 2.

Although a QR code is used as the image that indicates the search condition in this embodiment, other images, such as a steganographic image, may be used instead. Furthermore, whether or not to print the QR code may be toggled using a switch or the like.

Finally, the configuration and functions of all or part of the image printing system 1, the image forming apparatus 2, and the terminal 3, the details or order of the processing performed thereby, the details and configurations of the various tables, the details of the various pieces of data, and so on can be modified in various ways within the spirit of the present invention. Furthermore, it goes without saying that while the above embodiments provided an example of a user number, this is not limited to a number per se, and various known types of information for identifying a user may be used as well.

According to the present embodiment, it is possible for a user to perform printing operations when printing web pages related to a printed web page more easily than was conventionally possible.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printing system comprising:
a terminal configured to be connected to a search engine; and
an image forming apparatus configured to be connected to the search engine and the terminal, and to have a printer, the terminal including
a conditional expression accepting portion accepting a conditional expression based on which a search is performed,
a first result receiving portion causing the search engine to search for a web page based on the conditional expression accepted by the conditional expression accepting portion, and receiving, from the search engine, a search result page indicating one or more hit pages that are web pages searched by the search engine,
a first result displaying portion displaying the search result page received by the first result receiving portion,
a first hit page obtaining portion obtaining a hit page selected from among the hit pages indicated in the search result page received by the first result receiving portion, and
a print command portion issuing, to the image forming apparatus, a command to print the hit page obtained by the first hit page obtaining portion, and sending the conditional expression accepted by the conditional expression accepting portion to the image forming apparatus, and
the image forming apparatus including
a first print controller causing the printer to print the hit page obtained by the terminal in accordance with the command issued from the terminal,
a second result receiving portion causing the search engine to search for a web page based on the conditional expression sent from the terminal, and receiving the search result page from the search engine,
a second result displaying portion displaying the search result page received by the second result receiving portion,
a second hit page obtaining portion obtaining a hit page selected from among the hit pages indicated in the search result page received by the second result receiving portion, and
a second print controller causing the printer to print the hit page obtained by the second hit page obtaining portion.

2. An image forming apparatus configured to be connected to a search engine and a terminal, and to have a printer, the image forming apparatus comprising:
a command receiving portion receiving, from the terminal, a command to print a web page, and a conditional expression based on which the search engine has been caused to search for the web page;
a first print controller causing the printer to print a web page in accordance with the command received by the command receiving portion;
a search controller causing the search engine to execute a search process based on the conditional expression received by the command receiving portion;
a result receiving portion receiving, from the search engine, a search result page indicating one or more hit pages that are web pages searched by the search engine;
a search result page display portion displaying the search result page received by the result receiving portion;
a selected web page obtaining portion obtaining a web page selected from among the web pages indicated in the search result page received by the result receiving portion; and
a second print controller causing the printer to print the web page obtained by the selected web page obtaining portion.

3. The image forming apparatus according to claim 2, further comprising
a conditional expression storage portion storing the conditional expression received by the command receiving portion in association with a user identifier for identifying a user specifying the conditional expression received by the command receiving portion, and
a designation portion causing the user to specify the user identifier,
wherein the search controller causes the search engine to execute the search process based on the conditional expression stored in the conditional expression storage portion in association with the user identifier specified in the designation portion.

4. The image forming apparatus according to claim 3, wherein if the conditional expression storage portion stores a plurality of conditional expressions in association with an identical user identifier, the search controller causes the search engine to search for a web page based on the conditional expression last stored in the conditional expression storage portion.

5. The image forming apparatus according to claim 3, further comprising
a conditional expression changing portion causing the user to change the conditional expression stored in the conditional expression storage portion,
wherein the search controller causes the search engine to search for a web page based on the conditional expression changed in the conditional expression changing portion.

6. The image forming apparatus according to claim 2, further comprising
a third print controller causing the printer to print a conditional expression image indicating the conditional expression received by the command receiving portion, and
a conditional expression image reader reading the conditional expression image,
wherein the search controller causes the search engine to search for a web page based on the conditional expression indicated in the conditional expression image read by the conditional expression image reader.

7. A method for printing a web page using an image forming apparatus, the image forming apparatus being configured to be connected to a terminal, and to have a printer, the method causing the terminal to perform:
accepting processing of accepting a conditional expression based on which a search is performed;

first result receiving processing of causing a search engine to search for a web page based on the conditional expression thus accepted, and receiving, from the search engine, a search result page indicating one or more hit pages that are web pages searched by the search engine;

first display processing of displaying the search result page received by the first result receiving processing;

first hit page obtaining processing of obtaining a hit page selected from among the hit pages indicated in the search result page received by the first result receiving processing; and processing of issuing, to the image forming apparatus, a command to print the hit page obtained by the first hit page obtaining processing, and sending the conditional expression accepted by the accepting processing to the image forming apparatus, and the method causing the image forming apparatus to perform:

processing of causing the printer to print the hit page in accordance with the command issued from the terminal;

second result receiving processing of causing the search engine to search for a web page based on the conditional expression sent from the terminal, and receiving the search result page from the search engine;

processing of displaying the search result page received by the second result receiving processing;

second hit page obtaining processing of obtaining a hit page selected from among the hit pages indicated in the search result page received by the second result receiving processing; and processing of causing the printer to print the hit page obtained by the second hit page obtaining processing.

8. A non-transitory computer-readable storage medium storing a computer program for use in an image forming apparatus configured to be connected to a search engine and a terminal, and to have a printer, the computer program causing the image forming apparatus to perform:

receiving, from the terminal, a command to print a web page, and a conditional expression used when the web page has been searched;

printing, with the printer, a web page in accordance with the command thus received;

causing the search engine to search for a web page based on the conditional expression thus received;

receiving, from the search engine, a search result page indicating one or more hit pages that are web pages searched by the search engine;

displaying the search result page thus received;

obtaining a hit page selected from among the hit pages indicated in the search result page thus received; and printing, with the printer, the hit page thus obtained.

* * * * *